US012666092B2

(12) United States Patent
Chen et al.

(10) Patent No.: US 12,666,092 B2
(45) Date of Patent: Jun. 23, 2026

(54) LIVESTREAM DATA TRANSMISSION METHOD, APPARATUS AND SYSTEM, DEVICE AND MEDIUM

(71) Applicant: Beijing Bytedance Network Technology Co., Ltd., Beijing (CN)

(72) Inventors: Jianping Chen, Beijing (CN); Yongyi Yu, Beijing (CN); Qianghua Liu, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/863,574

(22) PCT Filed: May 10, 2023

(86) PCT No.: PCT/CN2023/093270
§ 371 (c)(1),
(2) Date: Nov. 6, 2024

(87) PCT Pub. No.: WO2023/217188
PCT Pub. Date: Nov. 16, 2023

(65) Prior Publication Data
US 2025/0310576 A1 Oct. 2, 2025

(30) Foreign Application Priority Data
May 11, 2022 (CN) .......................... 202210515125.2

(51) Int. Cl.
*H04N 21/2187* (2011.01)
*H04N 21/239* (2011.01)
(Continued)

(52) U.S. Cl.
CPC ..... *H04N 21/2187* (2013.01); *H04N 21/2393* (2013.01); *H04N 21/631* (2013.01); *H04N 21/643* (2013.01)

(58) Field of Classification Search
CPC ........... H04N 21/2187; H04N 21/2393; H04N 21/631; H04N 21/643; H04N 21/6405;
(Continued)

(56) References Cited

U.S. PATENT DOCUMENTS

2012/0173748 A1* 7/2012 Bouazizi ............... H04L 65/612
709/231
2015/0373075 A1* 12/2015 Perlman ................ H04L 65/762
709/217

FOREIGN PATENT DOCUMENTS

| CN | 104618337 A | 5/2015 |
| CN | 105392020 A | 3/2016 |
| CN | 107040549 A | 8/2017 |
| CN | 108260010 A | 7/2018 |

(Continued)

OTHER PUBLICATIONS

China National Intellectual Property Administration, Search Report Issued in Application No. 2022105151252, Nov. 20, 2023, 1 page.
(Continued)

*Primary Examiner* — Alazar Tilahun
(74) *Attorney, Agent, or Firm* — Alleman Hall LLP

(57) ABSTRACT

Examples of the disclosure disclose a method, apparatus, system, device and medium for transmitting livestream data. The method is applied to a livestream server. The method comprises: receiving a livestreaming request sent by a livestream client, and determining a livestream data stream matched with the livestreaming request, wherein the livestreaming request is transmitted through a first stream transmission channel, established by the livestream client, of a reliable type; creating a second stream transmission channel of an unreliable type, and establishing an association between the second stream transmission channel and the first stream transmission channel; sending response information for the livestreaming request and key information of a livestream data frame in the livestream data stream to the livestream client through the first stream transmission chan-
(Continued)

Receive a livestreaming request sent by a livestream client, and determine a livestream data stream matched with the livestreaming request — S110

Create a second stream transmission channel of an unreliable type, and establish an association between the second stream transmission channel and a first stream transmission channel — S120

Send, through the first stream transmission channel and to the livestream client, response information for the livestreaming request and key information of a livestream data frame in the livestream data stream — S130

Send, through the second stream transmission channel, the livestream data frame in the livestream data stream to the livestream client — S140 nel; and sending the livestream data frame in the livestream data stream to the livestream client through the second stream transmission channel.

18 Claims, 5 Drawing Sheets

(51) Int. Cl.
*H04N 21/63* (2011.01)
*H04N 21/643* (2011.01)

(58) Field of Classification Search
CPC ............. H04N 21/2183; H04N 21/222; H04N 21/26616; H04N 21/6408; H04N 21/64322; H04N 21/8456; H04L 65/611; H04L 65/612; H04L 67/02; H04L 69/164; H04L 69/16; H04L 69/161; H04L 69/326; H04L 69/18; H04L 69/329
See application file for complete search history.

(56) References Cited

FOREIGN PATENT DOCUMENTS

| CN | 108696772 A | 10/2018 |
|----|-------------|---------|
| CN | 108769726 A | 11/2018 |
| CN | 109150876 A | 1/2019 |
| CN | 109862038 A | 6/2019 |
| CN | 110557655 A | 12/2019 |
| CN | 112350979 A | 2/2021 |
| CN | 114979793 A | 8/2022 |
| KR | 20070070534 A | 7/2007 |
| WO | 2018103733 A1 | 6/2018 |

OTHER PUBLICATIONS

ISA China National Intellectual Property Administration, International Search Report Issued in Application No. PCT/CN2023/093270, Aug. 29, 2023, 4 pages.
China National Intellectual Property Administration, Search Report Issued in Application No. 2022105151252, Aug. 2, 2024, 1 page.

* cited by examiner

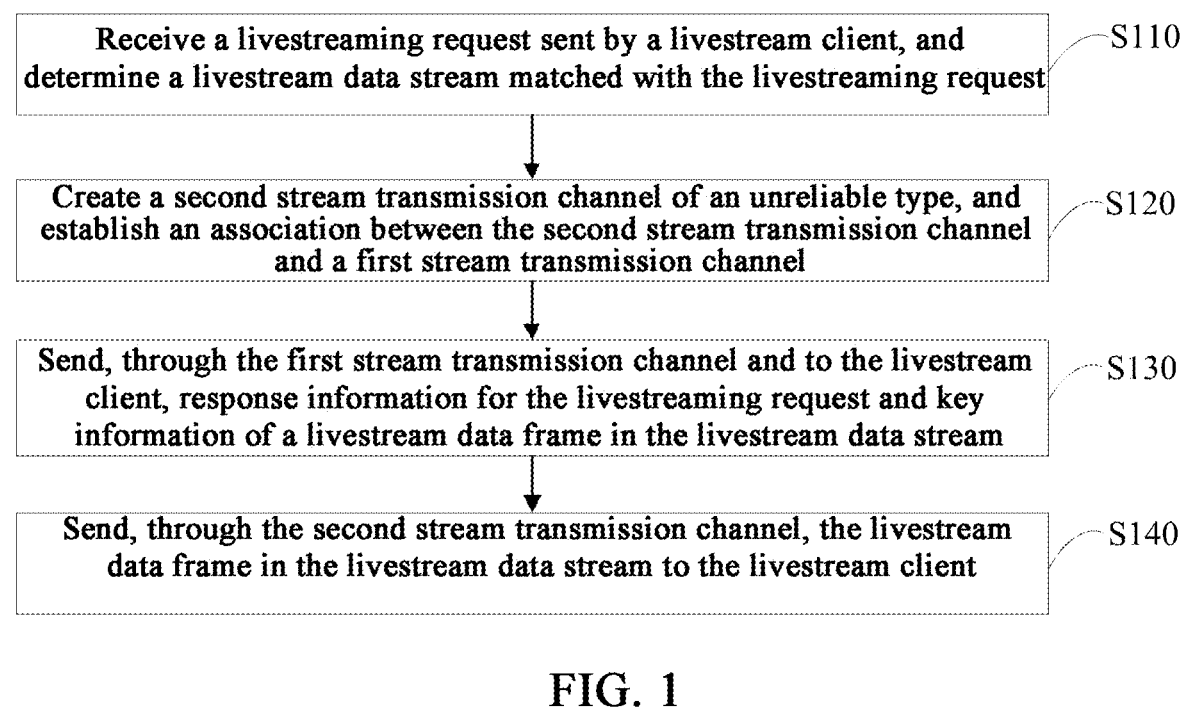

Receive a livestreaming request sent by a livestream client, and determine a livestream data stream matched with the livestreaming request    ⟋⎺S110

Create a second stream transmission channel of an unreliable type, and establish an association between the second stream transmission channel and a first stream transmission channel    ⟋⎺S120

Send, through the first stream transmission channel and to the livestream client, response information for the livestreaming request and key information of a livestream data frame in the livestream data stream    ⟋⎺S130

Send, through the second stream transmission channel, the livestream data frame in the livestream data stream to the livestream client    ⟋⎺S140

FIG. 1

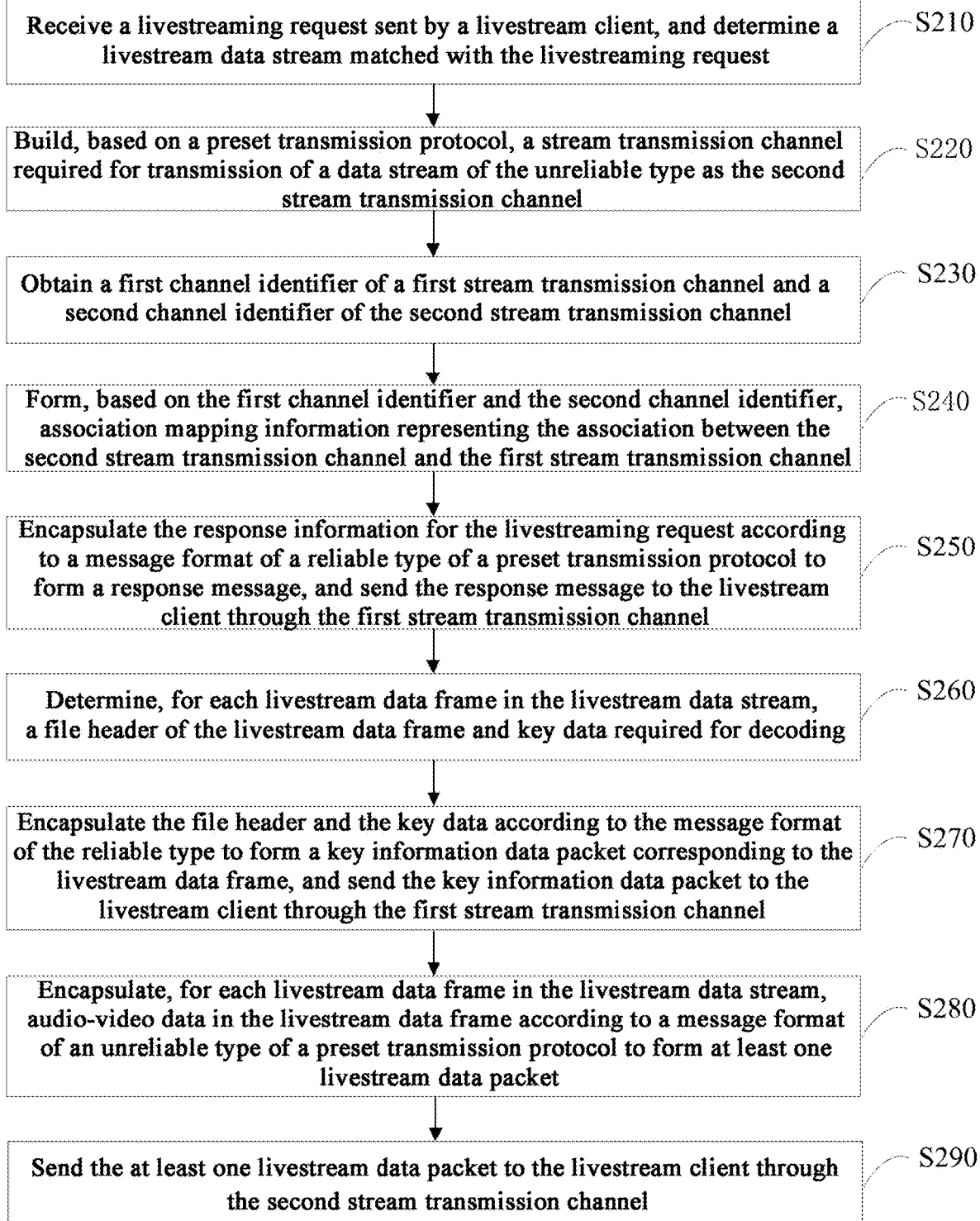

Receive a livestreaming request sent by a livestream client, and determine a livestream data stream matched with the livestreaming request — S210

Build, based on a preset transmission protocol, a stream transmission channel required for transmission of a data stream of the unreliable type as the second stream transmission channel — S220

Obtain a first channel identifier of a first stream transmission channel and a second channel identifier of the second stream transmission channel — S230

Form, based on the first channel identifier and the second channel identifier, association mapping information representing the association between the second stream transmission channel and the first stream transmission channel — S240

Encapsulate the response information for the livestreaming request according to a message format of a reliable type of a preset transmission protocol to form a response message, and send the response message to the livestream client through the first stream transmission channel — S250

Determine, for each livestream data frame in the livestream data stream, a file header of the livestream data frame and key data required for decoding — S260

Encapsulate the file header and the key data according to the message format of the reliable type to form a key information data packet corresponding to the livestream data frame, and send the key information data packet to the livestream client through the first stream transmission channel — S270

Encapsulate, for each livestream data frame in the livestream data stream, audio-video data in the livestream data frame according to a message format of an unreliable type of a preset transmission protocol to form at least one livestream data packet — S280

Send the at least one livestream data packet to the livestream client through the second stream transmission channel — S290

FIG. 2

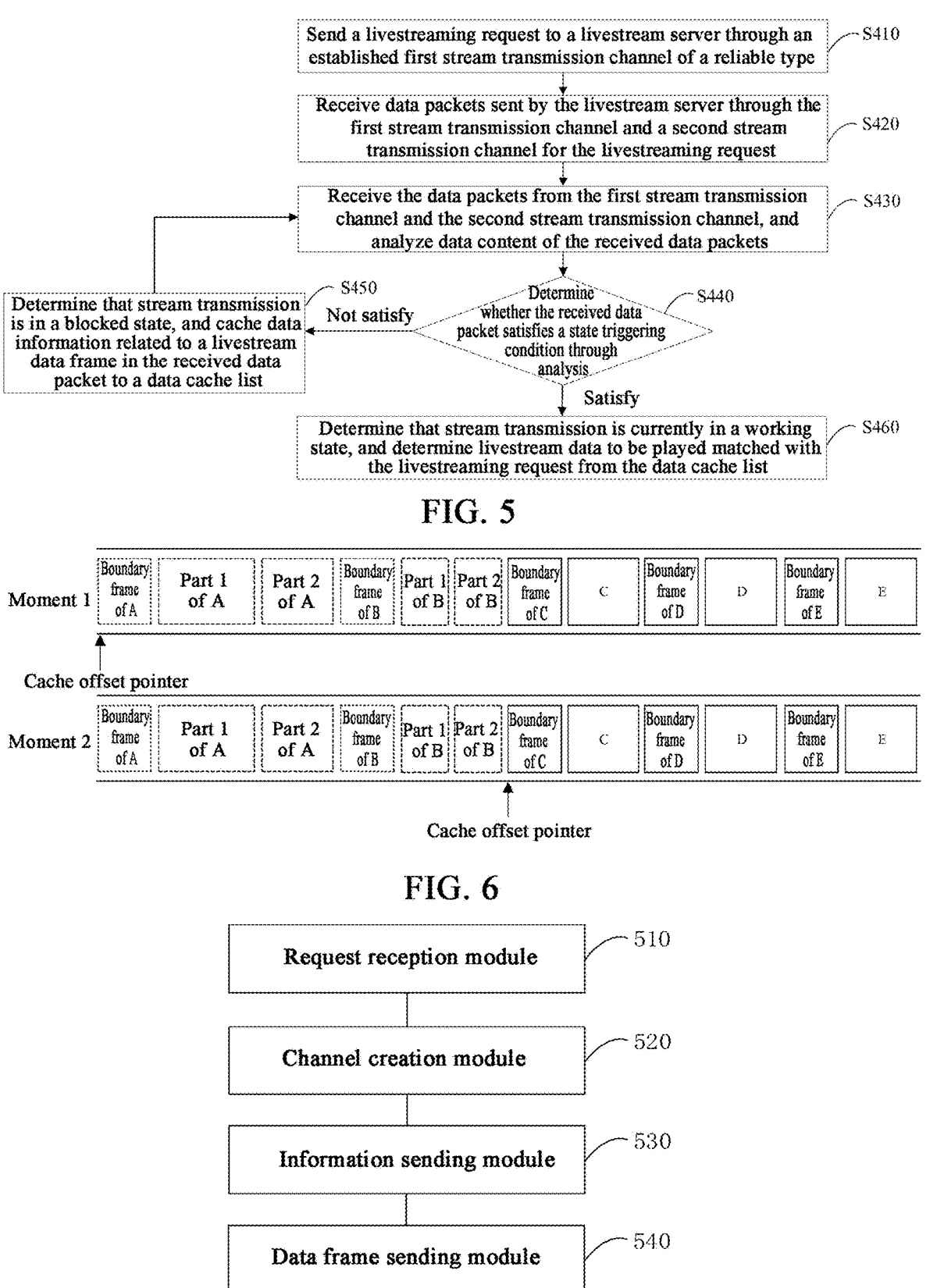

Send a livestreaming request to a livestream server through an established first stream transmission channel of a reliable type ⌐S410

Receive data packets sent by the livestream server through the first stream transmission channel and a second stream transmission channel for the livestreaming request ⌐S420

Receive the data packets from the first stream transmission channel and the second stream transmission channel, and analyze data content of the received data packets ⌐S430

⌐S450
Determine that stream transmission is in a blocked state, and cache data information related to a livestream data frame in the received data packet to a data cache list Not satisfy Determine whether the received data packet satisfies a state triggering condition through analysis ⌐S440

Satisfy

Determine that stream transmission is currently in a working state, and determine livestream data to be played matched with the livestreaming request from the data cache list ⌐S460

FIG. 5

Moment 1 | Boundary frame of A | Part 1 of A | Part 2 of A | Boundary frame of B | Part 1 of B | Part 2 of B | Boundary frame of C | C | Boundary frame of D | D | Boundary frame of E | E Cache offset pointer Moment 2 | Boundary frame of A | Part 1 of A | Part 2 of A | Boundary frame of B | Part 1 of B | Part 2 of B | Boundary frame of C | C | Boundary frame of D | D | Boundary frame of E | E Cache offset pointer

FIG. 6

Request reception module ⌐510

Channel creation module ⌐520

Information sending module ⌐530

Data frame sending module ⌐540

FIG. 7

LIVESTREAM DATA TRANSMISSION METHOD, APPARATUS AND SYSTEM, DEVICE AND MEDIUM

CROSS-REFERENCE TO RELATED APPLICATION(S)

The disclosure is a U.S. National Stage Application of PCT Application Serial No. PCT/CN2023/093270, filed May 10, 2023, which claims the priority to Chinese Patent Application No. 202210515125.2, filed with the Chinese Patent Office on May 11, 2022, which are incorporated in their entireties herein by reference.

FIELD

Examples of the disclosure relate to the internet technology, and relate to a livestream data transmission method, apparatus, system, device and medium, for instance.

BACKGROUND

In a livestreaming application scenario, a server needs to transmit livestream data to a livestream client. Generally, transmission of the livestream data depends on a transmission protocol of a transmission layer. Different transmission protocols are equivalent to different data transmission modes used to transmit the livestream data. At present, the transmission protocol used to transmit the livestream data on the transmission layer comprise a transmission control protocol (TCP) or a quick UDP internet connection (QUIC) protocol.

Wherein TCP-based transmission is reliable, and the QUIC protocol is also reliable in nature. During reliable transmission of a livestream data stream based on the above protocols, livestream pictures played at the livestream client will be affected due to network transmission delay. Accordingly, a playing effect of the livestream data will be affected, and user experience for the livestream client will be reduced.

SUMMARY

Examples of the disclosure provide a method, an apparatus, a system, a device and a medium for transmitting livestream data, to implement unreliable transmission of the livestream data, so as to ensure the playing effect of the livestream data, and improve the user experience.

In a first aspect, an example of the disclosure provides a method for transmitting livestream data. The method is applied to a livestream server and comprises:

receiving a livestreaming request sent by a livestream client, and determining a livestream data stream matched with the livestreaming request, wherein the livestreaming request is transmitted through a first stream transmission channel of a reliable type established by the livestream client;

creating a second stream transmission channel of an unreliable type, and establishing an association between the second stream transmission channel and the first stream transmission channel;

sending, through the first stream transmission channel and to the livestream client, response information for the livestreaming request and key information of a livestream data frame in the livestream data stream; and sending, through the second stream transmission channel, the livestream data frame in the livestream data stream to the livestream client.

In a second aspect, an example of the disclosure further provides a method for transmitting livestream data. The method is applied to a livestream client and comprises:

sending a livestreaming request to a livestream server through an established first stream transmission channel of a reliable type;

receiving data packets sent by the livestream server through the first stream transmission channel and a second stream transmission channel for the livestreaming request, wherein the second stream transmission channel is a stream transmission channel of an unreliable type created by the livestream server; and determining livestream data to be played matched with the livestreaming request by analyzing the data packets received from the first stream transmission channel and the second stream transmission channel.

In a third aspect, an example of the disclosure further provides an apparatus for transmitting livestream data. The apparatus is integrated into a livestream server and comprises:

a request reception module, configured to receive a livestreaming request sent by a livestream client, and determine a livestream data stream matched with the livestreaming request, wherein the livestreaming request is transmitted through a first stream transmission channel of a reliable type established by the livestream client;

a channel creation module, configured to create a second stream transmission channel of an unreliable type, and establish an association between the second stream transmission channel and the first stream transmission channel;

an information sending module, configured to send, through the first stream transmission channel and to the livestream client, response information for the livestreaming request and key information of a livestream data frame in the livestream data stream; and a data frame sending module, configured to send, through the second stream transmission channel, the livestream data frame in the livestream data stream to the livestream client.

In a fourth aspect, an example of the disclosure further provides an apparatus for transmitting livestream data. The apparatus is integrated into a livestream client and comprises:

a request sending module, configured to send a livestreaming request to a livestream server through an established first stream transmission channel of a reliable type;

a data packet reception module, configured to receive data packets sent by the livestream server through the first stream transmission channel and a second stream transmission channel for the livestreaming request, wherein the second stream transmission channel is a stream transmission channel of an unreliable type created by the livestream server; and a livestream data determination module, configured to determine livestream data to be played matched with the livestreaming request by analyzing the data packets received from the first stream transmission channel and the second stream transmission channel.

In a fifth aspect, an example of the disclosure further provides a system for transmitting livestream data. The system comprises: a livestream server and a livestream client.

The livestream server is configured to implement the method for transmitting livestream data according to the first aspect.

The livestream client is configured to implement the method for transmitting livestream data according to the second aspect.

In a sixth aspect, an example of the disclosure further provides an electronic device.

The electronic device comprises:

at least one processor; and a memory configured to store at least one program.

When the at least one program is executed by the at least one processor, the at least one processor is caused to implement the method for transmitting livestream data according to any one of the examples of the disclosure.

In a seventh aspect, an example of the disclosure further provides a computer-readable storage medium, which stores a computer program. When the computer program is executed by a processor, the method for transmitting livestream data according to any one of the examples of the disclosure is implemented.

BRIEF DESCRIPTION OF THE DRAWINGS

In the drawings, the same or similar reference numerals denote the same or similar elements. It should be understood that the drawings are illustrative, and components and elements are not necessarily drawn to scale.

FIG. 1 is a flow diagram of a method for transmitting livestream data according to Embodiment 1 of the disclosure;

FIG. 2 is a flow diagram of a method for transmitting livestream data according to Embodiment 2 of the disclosure;

FIG. 5 is a flow diagram of a method for transmitting livestream data according to Embodiment 4 of the disclosure;

FIG. 6 is a schematic diagram of movement of a cache offset pointer according to Embodiment 4 of the disclosure;

FIG. 7 is a schematic structural diagram of an apparatus for transmitting livestream data according to Embodiment 5 of the disclosure;

DETAILED DESCRIPTION OF EMBODIMENTS

Figure 3:
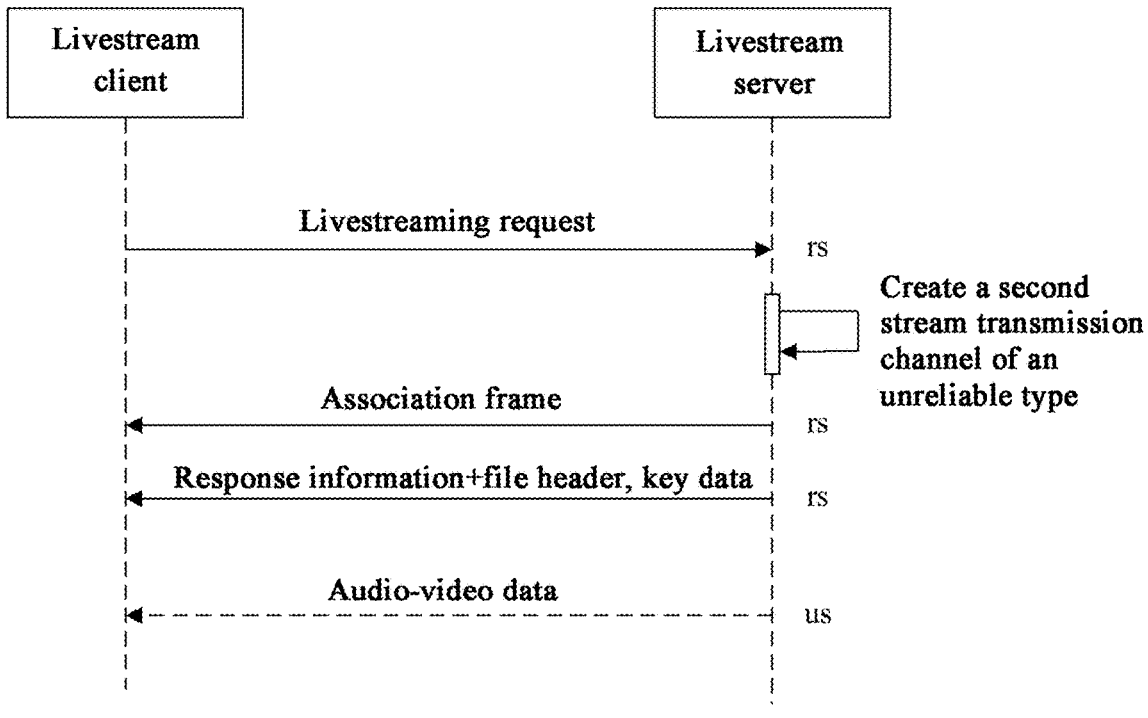
FIG. 3 is a schematic diagram of a process of transmitting livestream data according to Embodiment 2 of the disclosure.

Examples of the disclosure will be described in more detail below with reference to the accompanying drawings.

It should be understood that all steps described in method embodiments of the disclosure may be executed in a different order and/or in parallel. Further, the method embodiments may comprise additional steps and/or omit execution of the illustrated steps, which do not limit the scope of the disclosure.

The terms "comprise" and "comprise" used herein and their variations are open-ended, that is, "comprise but not limited to" and "comprise but not limited to". The term "based on" means "at least partly based on". The term "an example" means "at least one example". The term "another example" means "at least another example". The term "some examples" means "at least some examples". Related definitions of other terms will be given in the following description.

It should be noted that concepts such as "first" and "second" mentioned in the disclosure are only used to distinguish different apparatuses, modules or units, and are not used to limit an order or interdependence of functions executed by the apparatuses, modules or units.

It should be noted that modification with "a", "an" or "a plurality of" mentioned in the disclosure is illustrative rather than limitative, and should be understood by those skilled in the art as "at least one" unless explicitly stated otherwise in the context.

Names of messages or information exchanged between a plurality of apparatuses in the embodiment of the disclosure are only for illustrative purposes, instead of limiting the scope of the messages or information.

Embodiment 1

FIG. 1 is a flow diagram of a method for transmitting livestream data according to Embodiment 1 of the disclosure. The example may be applied to a case that livestream data is transmitted through a stream transmission channel of an unreliable type, so as to ensure a playing effect of the livestream data. The method may be executed by an apparatus for transmitting livestream data. The apparatus may be implemented in a mode of software and/or hardware, and is integrated into a livestream server. As shown in FIG. 1, the method comprises the following steps:

S110, a livestreaming request sent by a livestream client is received, and a livestream data stream matched with the livestreaming request is determined.

The livestreaming request is transmitted through a first stream transmission channel, established by the livestream client, of a reliable type.

Clearly, with development of the internet technology and intelligent mobile terminal devices, livestreaming is a hot form of entertainment and learning currently, which can bring people a more real-time social experience. Livestreaming is an information network publishing method with a two-way circulation process, which produces and publishes an information stream about a development process of an event simultaneously with on-the-spot occurrence of the event. To make user experience better, zero delay of a livestreaming picture needs to be ensured.

A livestreaming scenario generally comprises a livestream client, a livestream server, and a livestreamer client. The livestream client refers to a client used by an audience user, and the audience user refers to a user who watches a livestreaming content of a livestreamer user. The livestreamer client refers to a client used by the livestreamer user, and the livestreamer user refers to a user who conducts content livestreaming. The livestream server refers to a server that provides an information interaction service between the livestream client and the livestreamer client. The client may comprise, but is not limited to, a terminal device such as a smart phone, a tablet computer, a laptop computer, and a desktop computer, or an application (APP) that runs in the terminal device and has a livestreaming function. The livestreamer client may upload the livestreaming content of the livestreamer user to the livestream server in real time, and the livestream server transmits the livestreaming content to the livestream client for display, such that the audience user may watch the livestreaming content of the livestreamer user in real time. The example mainly describes interaction between the livestream client and the livestream server.

When a user needs to watch a livestream, the livestreaming request is generated through an operation on a livestream watching prompt information at the livestream client. The livestreaming request may comprise an identifier of a data stream to be livestreamed. A form of the livestreaming request is not limited by the example. For instance, the livestreaming request may be a message including the identifier of the data stream to be livestreamed. Before the livestreaming request is sent, a normal connection between the livestream client and the livestream server should be established. The livestream client needs to establish a stream transmission channel with the livestream server based on a preset transmission protocol, so as to implement communication between the livestream client and the livestream server.

In the example, the stream transmission channels comprise the stream transmission channel of the reliable type and the stream transmission channel of the unreliable type. The stream transmission channel of the reliable type may be understood as follows: after a receiving end receives a data packet sent by a sending end, a confirm message corresponding to the received packet or a confirm frame may be sent to the sending end, such that the sending end may continue to send a next data packet after receiving the confirm message or the confirm frame. In this way, it is ensured that after the receiving end receives the data packet, the sending end further continues to send the next data packet. In this step, the livestream client may be regarded as the sending end while the livestream server may be regarded as the receiving end.

In the example, the stream transmission channel established by the livestream client is the stream transmission channel of the reliable type, which is denoted as the first stream transmission channel. Considering that the livestreaming request is key information, whether the livestreaming request is sent successfully needs to be determined, that is, a response from the livestream server needs to be obtained. Therefore, the livestreaming request sent by the livestream client is transmitted through the first stream transmission channel, established by the livestream client, of the reliable type.

It should be noted that the livestreamer client may upload the livestreaming content of the livestreamer user to the livestream server in real time. That is, the livestream server needs to obtain a data stream from the livestreamer client. The livestream data stream refers to a continuous data stream required for continuous livestreaming. The livestream data stream mainly comprises an audio-video data stream. For instance, after the livestream client sends the livestreaming request through the first stream transmission channel, the livestream server receives the livestreaming request. The livestream server parses the livestreaming request, and the identifier of the data stream to be livestreamed comprised in the livestreaming request is obtained. It may be understood that the livestream server continuously obtains the livestream data stream from the livestreamer client, and each livestream data stream corresponds to a unique identifier. According to the parsed identifier of the data stream to be livestreamed, a matched data stream identifier may be inquired from the livestream server, and the livestream data stream matched with the livestreaming request may be determined. The determined livestream data stream is used as an object to be transmitted for subsequent transmission.

S120, a second stream transmission channel of an unreliable type is created, and an association between the second stream transmission channel and the first stream transmission channel is established.

The stream transmission channel of the unreliable type is relative to the stream transmission channel of the reliable type. The stream transmission channel of the unreliable type may be understood as follows: after data is transmitted through the transmission channel, the receiving end does not need to send corresponding confirmation to the sending end for data that is successfully received, and sends newly generated data while giving-up of retransmission of data of the lost packet is allowed. In this step, the livestream client may be regarded as the sending end while the livestream server may be regarded as the receiving end. The stream transmission channel of the unreliable type may implement unreliable transmission of data, such that real-time performance of the data can be ensured.

In this step, the livestream server creates the stream transmission channel of the unreliable type as the second stream transmission channel according to the preset transmission protocol. In order to ensure that content related to the livestreaming request is transmitted through the first stream transmission channel and the second stream transmission channel corresponding to the livestreaming request, the second stream transmission channel needs to be associated with the first stream transmission channel. The association may be established as follows: an identifier of the first stream transmission channel is bound to an identifier of the second stream transmission channel, such that a one-to-one correspondence is achieved. In this way, when an identifier of one stream transmission channel is known, the other stream transmission channel associated with the identifier may be determined. The identifier of the stream transmission channel may be understood as a unique identifier of the stream transmission channel, and the stream transmission channel is in one-to-one correspondence with the identifier.

For instance, this step is conducted after S110. The livestream server creates the second stream transmission channel of the unreliable type according to the preset transmission protocol, and establishes the association between the second stream transmission channel and the first stream transmission channel.

After S110 and S120 are executed, two stream transmission channels are established between the livestream client and the livestream server, which comprise the first stream transmission channel and the second stream transmission channel configured to conduct interactive communication between the livestream client and the livestream server. S130 and S140 introduce information transmitted through the first stream transmission channel and the second stream transmission channel respectively.

S130, response information for the livestreaming request and key information of the livestream data frame in the livestream data stream is transmitted to the livestream client through the first stream transmission channel.

The response information for the livestreaming request indicates response information generated by the livestream server receiving the livestreaming request sent by the livestream client. In this example, information to be sent by the livestream server to the livestream client is transmitted through the two stream transmission channels created in the above step respectively. The response information for the livestreaming request is sent to the livestream client through the first stream transmission channel, so as to inform the livestream client that the livestream server successfully receives the livestreaming request.

In this example, the livestream data stream refers to a continuous data stream required for continuous livestreaming. The livestream data stream is composed of a plurality of livestream data frames. Each livestream data frame may be divided into at least one data packet. In this step, information of the livestream data frame in the livestream data stream is divided into two parts. One of the parts is the key information of the livestream data frame, and the other part is the audio-video data in the livestream data frame. The key information refers to information that cannot have a packet loss problem and has to be sent successfully, such as a header file and key data for audio-video decoding.

In this example, the key information of the livestream data frame in the livestream data stream is sent to the livestream client through the first stream transmission channel. The first stream transmission channel is the stream transmission channel of the reliable type. The key information is transmitted through the channel, which can ensure that the livestream server may continue to send the next data packet after the livestream client receives the data packet, so as to ensure no packet loss.

It may be understood that in order to transmit the response information for the livestreaming request and the key information of the livestream data frame in the livestream data stream through the first stream transmission channel, it is necessary to encapsulate the response information for the livestreaming request into a message according to the message format of the reliable type of the preset transmission protocol, and also encapsulate the key information of the livestream data frame in the livestream data stream into a data packet according to the message format of the reliable type of the preset transmission protocol. Optionally, a quick UDP internet connection (QUIC) protocol is used as the preset transmission protocol in this example. The QUIC protocol comprises a reliable stream type and an unreliable stream type. The formed message and data packet are transmitted through the first stream transmission channel.

S140, the livestream data frame in the livestream data stream is sent to the livestream client through the second stream transmission channel.

In the related art, all communication between the livestream client and the livestream server is based on the stream transmission channel of the reliable type, and the livestream data frame in the livestream data stream is transmitted through the stream transmission channel of the reliable type according to the message format of the reliable type of the preset transmission protocol. In this case, when the livestream client is receiving a data packet in a livestream data frame, if the data packet is lost and is received incompletely or a network speed is low, the livestream client may wait to receive the to-be-received data packet all the time, and cannot encapsulate and upload the received data frame to an application layer, such that a livestreaming picture corresponding to the livestream data frame cannot be formed. In this case, the livestreaming picture is stopped at a picture corresponding to a previous livestream data frame, and the livestreaming picture is frozen and delayed.

Considering that even if one or more livestream data frames are lost and not transmitted to the livestream client, the finally formed livestreaming picture will not be obviously affected, in this example, the livestream data frame in the livestream data stream is sent to the livestream client through the second stream transmission channel. The second stream transmission channel is the stream transmission channel of the unreliable type. When the data packet is transmitted through the channel, packet loss may be allowed and it is not necessary to ensure that the livestream server may continue to send a next data packet after the livestream client receives the data packet. It may also be understood that the livestream server may continue to send the data packet without determining whether a previous data packet is successfully received by the livestream client.

In this example, a livestream data frame may be considered to be discarded if the livestream client does not completely receive all data packets of the frame within a set period. As such, it can be avoided that the picture is delayed or frozen because the livestream client keeps waiting for a certain data packet and thus cannot receive the data packet of the next livestream data frame. Network transmission delay cannot affect livestreaming picture playing, which ensures playing fluency of the livestream data.

It should be noted that an execution order of S130 and S140 is not limited. Information transmitted through the first stream transmission channel may reach the livestream client earlier, or information transmitted through the second stream transmission channel may reach the livestream client earlier, or information transmitted through the first stream transmission channel and information transmitted through the second stream transmission channel may reach the livestream client simultaneously.

In this example, the livestream data stream may be understood as a data set including several livestream data frames, and the live data frames are output in a streaming manner. The livestream data frame comprises at least one data packet. The data packet may refer to data sent by the livestream server to the livestream client each time, for instance, a QUIC packet.

For instance, the livestream server may divide and encapsulate data of each livestream data frame in the determined livestream data stream based on a preset data packet size and a size of each livestream data frame in the livestream data stream, so as to obtain the data packet corresponding to the livestream data stream. If a size of a livestream data frame is greater than the preset data packet size, the livestream data frame may be encapsulated into at least two data packets for transmission. The livestream server sends the data packets corresponding to the livestream data stream to the livestream client through the second stream transmission channel in an encapsulating order of the data packets.

According to the technical solution of the example of the disclosure, the livestream server receives the livestreaming request sent by the livestream client, and determines the livestream data stream matched with the livestreaming request. The livestreaming request is sent through the first stream transmission channel, established by the livestream client, of the reliable type. Then, the livestream server creates the second stream transmission channel of the unreliable type, and establishes the association between the second stream transmission channel and the first stream transmission channel. The livestream server sends the response information for the livestreaming request and the key information of the livestream data frame in the livestream data stream to the livestream client through the first stream transmission channel. The livestream data frame in the livestream data stream is sent to the livestream client through the second stream transmission channel. In this technical solution, the livestream server creates the second stream transmission channel of the unreliable type, such that unreliable transmission of the livestream data frame can be implemented. As such, an effect of network transmission delay on livestreaming picture playing can be avoided, a playing effect of the livestream data can be ensured, and user experience of the livestream client can be improved.

Based on the technical solution, after the second stream transmission channel, associated with the first stream transmission channel, of the unreliable type is created, the method further comprises the following step: an association frame representing the association between the second stream transmission channel and the first stream transmission channel is sent to the livestream client through the first stream transmission channel, to cause the livestream client to determine through the association frame that the first stream transmission channel is associated with the second stream transmission channel.

In this example, in order to ensure that content related to the livestreaming request is transmitted through the first stream transmission channel and the second stream transmission channel corresponding to the livestreaming request, the second stream transmission channel needs to be associated with the first stream transmission channel. Accordingly, after the livestream server creates the second stream transmission channel, associated with the first stream transmission channel, of the unreliable type, the association between the second stream transmission channel and the first stream transmission channel needs to be sent to the livestream client, to cause the livestream client to determine through the association frame that the first stream transmission channel is associated with the second stream transmission channel.

In this step, the association between the first stream transmission channel and the second stream transmission channel may be represented in a form of the association frame. The association frame comprises: association mapping information of stream transmission channels. The association mapping information comprises respective channel identifiers of the first stream transmission channel and the second stream transmission channel. It may be understood that the channel identifier may be used as an identity identifier of the stream transmission channel, and each stream transmission channel corresponds to a unique channel identifier. The association frame representing the association between the second stream transmission channel and the first stream transmission channel is sent to the livestream client through the first stream transmission channel. In this way, according to the association frame, the livestream client may ensure that received data is synthesized for the same data frame.

The stream transmission channel of the unreliable type is associated with the stream transmission channel of the reliable type, such that information transmitted through different stream transmission channels aiming at the same livestream data frame can be determined, and thus the livestream data frame can be determined correctly.

Embodiment 2

FIG. 2 is a flow diagram of a method for transmitting livestream data according to Embodiment 2 of the disclosure. Based on Embodiment 1, the example refines the steps that "a second stream transmission channel of an unreliable type is created, and an association with a first stream transmission channel is established", "response information for a livestreaming request and key information of a livestream data frame in a livestream data stream is sent to a livestream client through the first stream transmission channel", and "the livestream data frame in the livestream data stream is sent to the livestream client through the second stream transmission channel". Interpretations of terms identical to or corresponding to the above example will not be repeated herein.

With reference to FIG. 2, the method for transmitting livestream data according to the example comprises the following steps:

S210, a livestreaming request sent by a livestream client is received, and a livestream data stream matched with the livestreaming request is determined.

The livestreaming request is transmitted through a first stream transmission channel, established by the livestream client, of a reliable type.

S220, a stream transmission channel required for transmission of a data stream of an unreliable type is built based on a preset transmission protocol, which is denoted as a second stream transmission channel.

The preset transmission protocol refers to a standard of transmitting information between the livestream client and a livestream server. Optionally, a QUIC protocol is used as the preset transmission protocol in the example. The QUIC protocol comprises a reliable stream type and an unreliable stream type. The reliable stream type indicates that giving up the retransmission of data of a lost packet is not allowed, and new data may be sent only after the receiving end receives complete data. The unreliable stream type refers to a new stream type in the QUIC protocol. The unreliable stream type may indicate that newly generated data is transmitted while the giving-up of the retransmission of data of a lost packet is allowed. As such, unreliable transmission is implemented and real-time performance of data is ensured.

It may be known that in this example, the first stream transmission channel and the second stream transmission channel are built between the livestream client and the livestream server hereto. The first stream transmission channel is configured to transmit a data stream of a reliable type, and the second stream transmission channel is configured to transmit a data stream of an unreliable type.

S230, a first channel identifier of the first stream transmission channel and a second channel identifier of the second stream transmission channel are obtained.

In this example, after the first stream transmission channel and the second stream transmission channel are built, the first stream transmission channel and the second stream transmission channel need to be bound to represent that the data transmitted through the two channels are associated. It may be understood that the channel identifier may be used as an identity identifier of the stream transmission channel, and each stream transmission channel corresponds to a unique channel identifier. For instance, a channel identifier of the first stream transmission channel is obtained and denoted as the first channel identifier; and a channel identifier of the second stream transmission channel is obtained and denoted as the second channel identifier.

S240, association mapping information representing the association between the second stream transmission channel and the first stream transmission channel is formed based on the first channel identifier and the second channel identifier.

For instance, after the first channel identifier and the second channel identifier are obtained, the first channel identifier and the second channel identifier may be bound. For one group, a first channel identifier is in one-to-one correspondence with a second channel identifier. When a plurality of groups of first stream transmission channels and second stream transmission channels associated exist, a plurality of pieces of association mapping information representing associations between the second stream transmission channels and the first stream transmission channels may be formed. In a case where the first channel identifier is known, the second channel identifier corresponding to the first channel identifier may be obtained by inquiring the association mapping information. Similarly, in a case where the second channel identifier is known, the first channel identifier corresponding to the second channel identifier may be obtained by inquiring the association mapping information.

S250, response information for the livestreaming request is encapsulated according to a message format of a reliable type of the preset transmission protocol so as to form a response message, and the response message is sent to the livestream client through the first stream transmission channel.

It may be understood that the livestreaming request is sent by the livestream client to the livestream server through the first stream transmission channel, and the first stream transmission channel is a stream transmission channel of a reliable type, such that the livestream server needs to generate the response information for the livestreaming request after successfully receiving the livestreaming request. The response information for the livestreaming request indicates that the livestream server successfully receives the livestreaming request sent by the livestream client. Then, the livestream server needs to encapsulate and send the response information for the livestreaming request to the livestream client, so as to inform the livestream client of the fact that "the livestream server successfully receives the livestreaming request".

Similarly, the livestream client needs to be informed of whether the livestreaming request is successfully received by the livestream server, and packet loss is not allowed. Therefore, the response information for the livestreaming request is encapsulated according to the message format of the reliable type of the preset transmission protocol so as to form the response message. Optionally, a QUIC protocol is used as the preset transmission protocol in the example. The QUIC protocol comprises a reliable stream type and an unreliable stream type. In this step, the response information for the livestreaming request is encapsulated based on the reliable stream type. In a case where the first stream transmission channel is a channel of the reliable type, the response message encapsulated is sent to the livestream client through the first stream transmission channel.

After the building of the first stream transmission channel and the second stream transmission channel is complete and the livestream server sends the response message for the livestreaming request to the livestream client, the livestream server may send related information of the livestream data stream to the livestream client through the two built stream transmission channels.

In the related art, all the livestream data frames in the livestream data stream are encapsulated according to the message format of the reliable type, so as to form the data packets, and the data packets are sent to the livestream client through the stream transmission channel of the reliable type. Then, the livestream client delivers the data packets corresponding to the received livestream data frames to the application layer. It should be known that the livestream client needs to deliver a livestream data frame to the application layer only after receiving the complete livestream data frame. The network transmission delay may lead to data packet loss or transmission delay. In such case, when the data packets are transmitted only through the stream transmission channel of the reliable type, if a data packet is lost or delayed, the livestream client will keep waiting to receive remaining data packets in the frame, and the livestream client cannot deliver the data frame to the application layer. Thus a final livestreaming picture may be stopped at a livestreaming picture corresponding to a previous livestream data frame, and a livestreaming interface may be delayed or frozen.

In view of the problem, information of the livestream data frame in the livestream data stream is separated in this example, and transmitted through the stream transmission channel of the reliable type and the stream transmission channel of the unreliable type separately. The first stream transmission channel is the stream transmission channel of the reliable type, and the second stream transmission channel is the stream transmission channel of the unreliable type. The livestream data frame is divided into two parts: one part comprising a file header of the livestream data frame and key information required for decoding, and the other part comprising audio-video data in the livestream data frame. Considering that the file header of the livestream data frame and the key information required for decoding are both important and the data packet cannot be lost, the file header of the livestream data frame and the key information required for decoding are encapsulated and transmitted through the stream transmission channel of the reliable type, that is, through the first stream transmission channel. For the audio-video data in the livestream data frame, even if one or more data packets are lost, the final display of the livestreaming interface will not be affected. Therefore, the audio-video data of the livestream data frame is encapsulated and transmitted through the stream transmission channel of the unreliable type, that is, through the second stream transmission channel.

S260-S270 will introduce encapsulation and transmission of the file header in the livestream data frame and the key data required for decoding below. S280-S290 will introduce encapsulation and transmission of the audio-video data in the livestream data frame below.

S260, the file header of each livestream data frame in the livestream data stream and the key data required for decoding are determined.

It may be understood that in order to finally display the livestreaming picture, it is necessary to decode information received by a client so as to restore the original audio and video. Thus the key data required for decoding is very important. The livestream data stream comprises several livestream data frames. For each livestream data frame in the livestream data stream, the file header of the data frame and the key data required for decoding need to be determined firstly.

S270, the file header and the key data are encapsulated according to the message format of the reliable type to form a key information data packet corresponding to the livestream data frame, and the key information data packet is sent to the livestream client through the first stream transmission channel.

For instance, the file header and the key data are encapsulated according to the message format of the reliable type to form and the key information data packet corresponding to the livestream data frame. The livestream server may divide and encapsulate data of each livestream data frame in the livestream data stream based on a preset data packet size and a size of each livestream data frame in the livestream data stream, so as to obtain the key information data packet corresponding to the livestream data stream. If a size of a livestream data frame is greater than the preset data packet size, the livestream data frame may be encapsulated into at least two key information data packets for transmission. The livestream server sends the key information data packets corresponding to the livestream data stream to the livestream client in an encapsulating order of the key information data packets.

S280, audio-video data in each livestream data frame in the livestream data stream is encapsulated according to a message format of the unreliable type of the preset transmission protocol to form at least one livestream data packet.

Similarly, the livestream server may divide and encapsulate data of each livestream data frame in the livestream data stream based on the preset data packet size and the size of each livestream data frame in the livestream data stream, so as to obtain the livestream data packet corresponding to the livestream data stream. If a size of a livestream data frame is greater than the preset data packet size, the livestream data frame may be encapsulated into at least two livestream data packets for transmission.

S290, the at least one livestream data packet is sent to the livestream client through the second stream transmission channel.

For instance, the livestream server sends the livestream data packets corresponding to the livestream data stream to the livestream client in an encapsulating order of the livestream data packets.

According to the technical solution of the example, the livestream server receives the livestreaming request sent by the livestream client, determines the livestream data stream matched with the livestreaming request, and then builds the stream transmission channel required for transmission of the data stream of the unreliable type based on the preset transmission protocol, which is denoted as the second stream transmission channel; the second stream transmission channel is associated with the first stream transmission channel so as to form a mapping relation; and the livestream server divides content of the livestream data frame in the livestream data stream into the file header of the livestream data frame, the key data required for decoding, and the audio-video data of the livestream data frame. The two parts of data are encapsulated separately, and encapsulated results are transmitted to the livestream client through the first stream transmission channel and the second stream transmission channel respectively. In the technical solution, the second stream transmission channel of the unreliable type is added, such that unreliable transmission of the audio-video data in the livestream data frame can be implemented. As such, an effect of packet loss of the audio-video data caused by network transmission delay on livestreaming picture playing can be avoided, a playing effect of the livestream data can be ensured, and user experience of the livestream client can be improved.

Based on the technical solution, in a process of sending the livestream data frame in the livestream data stream to the livestream client through the second stream transmission channel, the method further comprises the following steps: determining an expiration duration of each livestream data frame in the livestream data stream, and executing, in response to that a retransmission operation for a related data packet of the livestream data frame is present, a discarding processing logic for the livestream data frame according to the expiration duration.

The expiration duration of the livestream data frame may be used as a duration reference for discarding a data packet if the data packet is not received. The expiration duration may be set according to demands. For instance, assuming that a time period for sending a data packet from the livestream server to the livestream client is T, the expiration duration of the livestream data frame may be set as 5T.

For instance, the expiration duration of each livestream data frame in the livestream data stream is determined. If a data packet is lost during transmission, the livestream server will retransmit the related data packet. If a lost data packet is still not received when the execution time of the retransmission operation exceeds the expiration duration, the incomplete livestream data frame will be discarded.

For instance, the step that in response to that the retransmission operation for the related data packet of the livestream data frame is present, the discarding processing logic for the livestream data frame is executed according to the expiration duration comprises the following step:

a) in response to determining that a related livestream data packet of the livestream data frame is lost during transmission, the related livestream data packet is resent through the second stream transmission channel, and retransmission timing is started when a retransmission of the data packet of the livestream data frame occurs for the first time.

The way of determining that the related livestream data packet of the livestream data frame is lost during transmission may be as follows: in response to determining that the livestream client does not receive the data packet within a time period in which the data packet is normally sent from the livestream server to the livestream client, determining that the packet loss occurs during transmission.

For instance, in response to determining that the livestream data packet of the livestream data frame is lost during transmission, the related livestream data packet is continued to be resent through the second stream transmission channel. The livestream data packet may be understood as a lost data packet. Moreover, when the retransmission of the related livestream data packet of the livestream data frame occurs for the first time, the retransmission timing is started to determine the retransmission duration.

The step further comprises the following step: b) in response to determining that an accumulated duration of the retransmission timing exceeds the expiration duration, forming an expiration information data packet corresponding to the livestream data frame, and sending the expiration information data packet to the livestream client, to cause the livestream client to discard related data of the livestream data frame from a data cache list.

For instance, if the accumulated duration of retransmission timing exceeds the expiration duration, the livestream client may be informed of discarding the related data of the livestream data frame with the packet loss for conducting transmission of a next livestream data frame. The way of informing the livestream client of discarding the related data of the livestream data frame may be as follows: the livestream server forms the expiration information data packet corresponding to the livestream data frame and sends the expiration information data packet to the livestream client.

For instance, FIG. 3 is a schematic diagram of a process of transmitting livestream data according to Embodiment 2 of the disclosure. As shown in FIG. 3, 1, a normal connection between a livestream client and a livestream server is established, and the livestream client creates a first stream transmission channel of a reliable type, which is named "rs"; 2, the livestream client sends a livestreaming request to the livestream server through the first stream transmission channel rs; 3, after receiving the request, the livestream server determines a livestream data stream matched with the livestreaming request, and creates a second stream transmission channel of an unreliable type associated with the first stream transmission channel, which is named "us"; 4, the livestream server sends an association frame representing the association between the second stream transmission channel and the first stream transmission channel to the livestream client through the first stream transmission channel rs, and informs the livestream client of associating us with rs; 5, the livestream server returns response information for the livestreaming request, a file header of a livestream data frame and key data required for decoding to the livestream client through the first stream transmission channel rs; and 6, the livestream server sends audio-video data to the livestream client through the second stream transmission channel us.

In an optional example, in a process of sending the livestream data frame in the livestream data stream to the livestream client through the second stream transmission channel, the method further comprises the following steps: an expiration duration of each livestream data frame in the livestream data stream is determined, and in response to that a retransmission operation for a related data packet of the livestream data frame is present, a discarding processing logic for the livestream data frame is executed according to the expiration duration. In the related art, a head of a data stream list of cache stream data may be blocked when a network quality is poor, and head blocking may cause a long delay of a livestreaming picture. In this case, a picture/voice in latest livestream data may be already cached in the data stream list of the livestream client, but it cannot be played normally, such that the playing effect of the livestream data is affected, and user experience of the livestream client is reduced. The technical solution of the optional example discards the livestream data frame corresponding to the packet loss, so as to ensure normal livestreaming.

Embodiment 3

Figure 4:
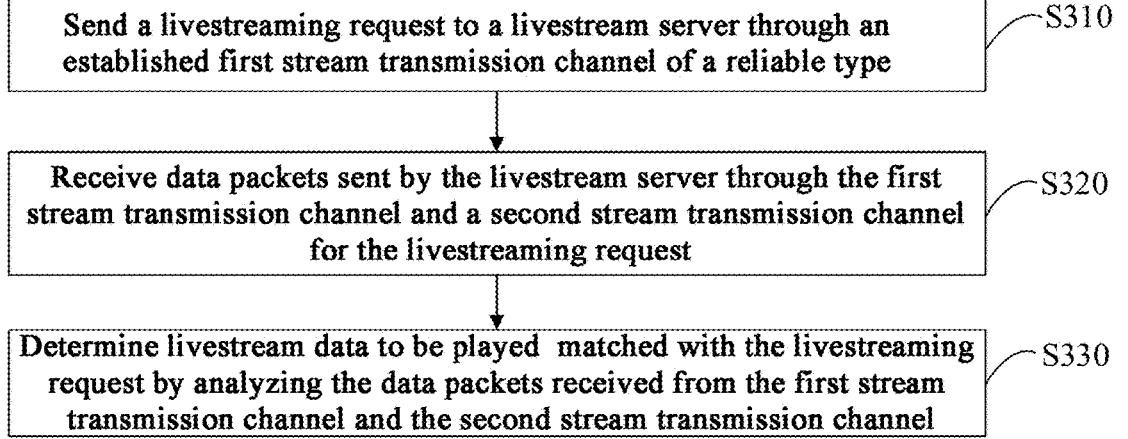
FIG. 4 is a flow diagram of a method for transmitting livestream data according to Embodiment 3 of the disclosure.

FIG. 4 is a flow diagram of a method for transmitting livestream data according to Embodiment 3 of the disclosure. The example may be applied to a case that livestream data is transmitted through a stream transmission channel of an unreliable type, so as to ensure a playing effect of the livestream data. The method may be executed by an apparatus for transmitting livestream data. The apparatus may be implemented in a mode of software and/or hardware, and is integrated into a livestream client. As shown in FIG. 4, the method comprises the following steps:

S310, a livestreaming request is sent to a livestream server through an established first stream transmission channel of a reliable type.

When a user needs to watch livestream, the livestreaming request is generated through an operation on a livestream watching prompt information at the livestream client. The livestreaming request may comprise a identifier of the data stream to be livestreamed. A form of the livestreaming request is not limited by the example. For instance, the livestreaming request may be a message including the identifier of the data stream to be livestreamed. Before the livestreaming request is sent, a normal connection between the livestream client and the livestream server should be established. The livestream client needs to establish a stream transmission channel with the livestream server based on a preset transmission protocol, so as to implement communication between the livestream client and the livestream server.

For instance, the livestream client establishes the first stream transmission channel of the reliable type, such that a normal connection between the livestream client and the livestream server is established. The livestream client transmits the livestreaming request to the livestream server through the first stream transmission channel.

S320, data packets sent by the livestream server through the first stream transmission channel and a second stream transmission channel according to the livestreaming request are received.

In the example, the second stream transmission channel is a stream transmission channel, established by the livestream server, of an unreliable type. Clearly, the livestream server creates the second stream transmission channel of the unreliable type after receiving the livestreaming request.

The data packets received through the first stream transmission channel are a response message corresponding to the livestreaming request, a key information data packet of a livestream data frame in a livestream data stream matched with the livestreaming request, and an association frame representing an association between the first stream transmission channel and the second stream transmission channel. The data packet received through the second stream transmission channel is a livestream data packet of the livestream data frame in the livestream data stream matched with the livestreaming request, and the livestream data packet comprises audio-video data of the livestream data frame.

In the step, reference may be made to related description in Embodiment 1 for a determination and transmission process of the data packet, which will not be repeated herein.

S330, livestream data to be played matched with the livestreaming request is determined by analyzing the data packets received from the first stream transmission channel and the second stream transmission channel.

For instance, a response message for the livestreaming request, a key information data packet of a livestream data frame in a livestream data stream matched with the livestreaming request, and an association frame representing an association between the first stream transmission channel and the second stream transmission channel may be received through the first stream transmission channel. Based on the response message for the livestreaming request, the livestream client may know that the livestream server successfully receives the livestreaming request. The key information data packet is decapsulated, such that a file header of the livestream data frame and key data required for decoding may be obtained. The association frame is decapsulated, such that the association between the first stream transmission channel and the second stream transmission channel may be obtained, and according to a recorded identifier of the second stream transmission channel corresponding to an identifier of the first stream transmission channel, the data packet received through the corresponding second stream transmission channel may be determined as associated data.

The livestream data packet of the livestream data frame in the livestream data stream matched with the livestreaming request is received through the second stream transmission channel. The livestream data packet comprises audio-video data of the livestream data frame. The livestream data packet is analyzed, that is, decapsulated, such that the audio-video data may be obtained.

After a data packet received from the first stream transmission channel is the response message for the livestreaming request, a subsequent operation is determined by analyzing an order of the livestream client to receive the key information data packet of the livestream data frame associated with the livestreaming request from the first stream transmission channel, to receive the association frame representing the association between the second stream transmission channel and the first stream transmission channel from the first stream transmission channel, and to receive the livestream data packet of the livestream data frame in the livestream data stream matched with the livestreaming request from the second stream transmission channel. It may be understood that an order in which the key information data packet of the livestream data frame and the association frame representing the association between the first stream transmission channel and the second stream transmission channel reach the livestream client is not limited, but data (that is, the audio-video data) transmitted by the unreliable stream transmission channel can be processed only after the key information data packet and the association frame both reach the livestream client.

In a case where a processing condition is satisfied, the livestream data frame may be determined to be delivered to an application layer according to data transmitted by the unreliable stream transmission channel. In a case where a processing condition is not satisfied, data transmitted by the unreliable stream transmission channel may be cached for later use.

According to the technical solution of the example of the disclosure, the livestream client transmits the livestreaming request to the livestream server through the first stream transmission channel established of the reliable type, and the livestream server receives the livestreaming request sent by the livestream client, and determines a livestream data stream matched with the livestreaming request. Then, the livestream server creates the second stream transmission channel of the unreliable type, and establishes the association between the second stream transmission channel and the first stream transmission channel. The livestream server transmits response information for the livestreaming request and key information of a livestream data frame in a livestream data stream to the livestream client through the first stream transmission channel. The livestream server transmits the livestream data frame in the livestream data stream to the livestream client through the second stream transmission channel. The livestream client determines livestream data to be played matched with the livestreaming request by analyzing data packets received from the first stream transmission channel and the second stream transmission channel. In the technical solution, the livestream server creates the second stream transmission channel of the unreliable type, such that unreliable transmission of the livestream data frame can be implemented. As such, an effect of a network transmission delay on livestreaming picture playing can be avoided, a playing effect of the livestream data can be ensured, and user experience of the livestream client can be improved.

Embodiment 4

FIG. 5 is a flow diagram of a method for transmitting livestream data according to Embodiment 4 of the disclosure. Based on Embodiment 3, the example refines the step that "livestream data to be played matched with a livestreaming request is determined by analyzing data packets received from a first stream transmission channel and a second stream transmission channel". Interpretations of terms identical to or corresponding to the above example will not be repeated herein.

With reference to FIG. 5, the method for transmitting data according to the example comprises the following steps:

S410, a livestreaming request is sent to a livestream server through an established first stream transmission channel of a reliable type.

S420, data packets sent by the livestream server through the first stream transmission channel and a second stream transmission channel according to the livestreaming request are received.

The second stream transmission channel is a stream transmission channel, established by the livestream server, of an unreliable type.

S430, the data packets are received from the first stream transmission channel and the second stream transmission channel, and data contents of the data packets received are analyzed.

For instance, a response message for the livestreaming request, a key information data packet of a livestream data frame in a livestream data stream matched with the livestreaming request, and an association frame representing an association between the first stream transmission channel and the second stream transmission channel may be received through the first stream transmission channel. Based on the response message of the livestreaming request, the livestream client may know that the livestream server successfully receives the livestreaming request. The key information data packet is decapsulated, such that a file header of the livestream data frame and key data required for decoding may be obtained. The association frame is decapsulated, such that the association between the first stream transmission channel and the second stream transmission channel may be obtained, and according to a recorded identifier of the second stream transmission channel corresponding to an identifier of the first stream transmission channel, the data packet received through the corresponding second stream transmission channel may be determined as associated data.

The livestream data packet of the livestream data frame in the livestream data stream matched with the livestreaming request is received through the second stream transmission channel. The livestream data packet comprises audio-video data of the livestream data frame. The livestream data packet is analyzed, that is, decapsulated, such that the audio-video data may be obtained.

It may be understood that an order in which the key information data packet of the livestream data frame and the association frame representing the association between the first stream transmission channel and the second stream transmission channel reach the livestream client is not limited, but data (that is, the audio-video data) sent by the unreliable stream transmission channel can be processed only after the key information data packet and the association frame both reach the livestream client. In a case where the association frame reaches the livestream client, relation mapping may be conducted on a stream data channel of a reliable type (that is, the first stream transmission channel) and a stream transmission channel of an unreliable type (that is, the second stream transmission channel). When a first frame of data of a reliable stream is received, a data packet transmitted through the second stream transmission channel that has been mapped is marked, and it is determined that the stream transmission is in a working state. For instance, the first frame of data of the reliable stream comprises File-Header and A/V Metadata, and further comprises hypertext transfer protocol (HTTP) Response Header in an HTTP transmission scenario. The first frame of data of the reliable stream generally refers to various initialization data. If the key information data packet of the livestream data frame or the association frame representing the association between the first stream transmission channel and the second stream transmission channel does not reach the livestream client but the data packet transmitted through the second stream transmission channel reaches the livestream client firstly, the state is determined to be a blocked state.

S440, whether a received data packet satisfies a state triggering condition is determined through analysis, in response to determining that the received data packet does not satisfy the state triggering condition, S450 is executed, and in response to determining that the received data packet satisfies the state triggering condition, S460 is executed.

The state triggering condition is as follows: after a data packet received from the first stream transmission channel is a response message for the livestreaming request, a key information data packet of the livestream data frame associated with the livestreaming request is received from the first stream transmission channel; and an association frame representing an association between the second stream transmission channel and the first stream transmission channel is also received from the first stream transmission channel.

For instance, an order in which data transmitted through the two stream transmission channels reach the livestream client is analyzed to determine whether the state triggering condition is satisfied. In a case where the state triggering condition is not satisfied, S450 is executed, and in a case where the state triggering condition is satisfied, S460 is executed.

S450, in response to determining that the received data packet does not satisfy the state triggering condition through analysis, it is determined that stream transmission is in a blocked state, data information related to the livestream data frame in the received data packet is cached to a data cache list, and S430 is continued to be executed.

For instance, in response to determining that the received data packet does not satisfy the state triggering condition through analysis, which is also understood as that after a data packet received from the first stream transmission channel is the response message for the livestreaming request, a key information data packet of the livestream data frame associated with the livestreaming request is not received from the first stream transmission channel or the association frame representing the association between the second stream transmission channel and the first stream transmission channel is not received from the first stream transmission channel, it is determined that stream transmission is in the blocked state. The data information related to the livestream data frame in the received data packet is cached to the data cache list, data packets are continued to be received from the first stream transmission channel and the second stream transmission channel, and an analysis operation of the received data packets is executed.

S460, in response to determining that the data received satisfies the state triggering condition through analysis, it is determined that stream transmission is currently in a working state, and the livestream data to be played matched with the livestreaming request is determined from the data cache list.

The livestream data frame is a data frame in the livestream data stream matched with the livestreaming request.

For instance, in response to determining that a received data packet satisfies the state triggering condition through analysis, which is also understood as that after a data packet received from the first stream transmission channel is the response message for the livestreaming request, a key information data packet of the livestream data frame associated with the livestreaming request is received from the first stream transmission channel and further the association frame representing the association between the second stream transmission channel and the first stream transmission channel is received from the first stream transmission channel, it is determined that stream transmission is in a normal state. The livestream data to be played matched with the livestreaming request is determined from the data cache list.

In the technical solution of the example, it is further defined that the livestream client determines whether the received data packet satisfies the state triggering condition by analyzing the data packets received from the first stream transmission channel and the second stream transmission channel. In response to determining that the received data packet does not satisfy the state triggering condition through analysis, it is determined that stream transmission is in the blocked state, the data information related to the livestream data frame in the received data packet is cached to the data cache list, and the analysis operation of a received data packet is continued to be executed. In response to determining that the received data packet satisfies the state triggering condition through analysis, it is determined that stream transmission is currently in the working state, and the livestream data to be played matched with the livestreaming request is determined from the data cache list. The above technical solution refines the state triggering condition limitation, such that a moment of data transmission to a user application layer is determined.

Based on the technical solution, the step that the data information related to the livestream data frame in the received data packet is cached to the data cache list comprises the following steps: in response to determining that the received data packet is a livestream data packet received by the second stream transmission channel, data information related to the livestream data frame in the received data packet is determined, and the data information is stored in the data cache list.

The livestream data packet received from the second stream transmission channel is audio-video data, that is, basic data required for livestreaming picture displaying. In response to determining that the received data packet does not satisfy the state triggering condition through analysis, it is determined that stream transmission is in the blocked state, data information related to the livestream data frame in the received data packet is determined, and the data information is stored in the data cache list. The data cache list is configured to provide livestream data to be played later.

Based on the technical solution, the step that the livestream data to be played matched with the livestreaming request is determined from the data cache list comprises the following step:

a2) a livestream data frame header pointed to by a cache offset pointer in the data cache list is determined.

The cache offset pointer indicates a position of data received in data cache of the application layer. A cache offset frame may refer to a frame type configured for an active expiration information data packet. The cache offset frame may carry an offset value to inform the livestream client and the livestream server not to retransmit all data before the offset value.

The step further comprises the following step: b2) in response to determining that data content of a target livestream data frame corresponding to the livestream data frame header is complete, the livestream data frame is determined as the livestream data to be played.

For instance, whether the data content of the target livestream data frame is complete may be determined by analyzing whether an end identifier of the target livestream data frame is received. In response to determining that the data content of the target livestream data frame corresponding to the livestream data frame header is complete, the livestream data frame is determined as the livestream data to be played.

The step further comprises the following step: c2) in response to determining that data content of a target livestream data frame corresponding to the livestream data frame header is incomplete, a content completeness determination of the target livestream data frame is re-performed at a set interval until an expiration information data packet sent by the livestream server for the target livestream data frame is received.

For instance, in response to not receiving the end identifier of the target livestream data frame, that is, in response to determining that the data content of the target livestream data frame corresponding to the livestream data frame header is incomplete, the content completeness determination of the target livestream data frame is re-performed at the set interval until the expiration information data packet sent by the livestream server for the target livestream data frame is received. Reference may be made to related description in Embodiment 3 for a generation and transmission process of the expiration information data packet, which will not be repeated herein.

The step further comprises the following step: d2) the cache offset pointer is moved to a livestream data frame header of a next frame of the target livestream data frame as a new target livestream data frame, and the above step is executed again for the content completeness determination.

For instance, after the expiration information data packet sent by the livestream server for the target livestream data frame is received, the cache offset pointer is moved to the livestream data frame header of the next frame of the target livestream data frame as the new target livestream data frame, and the above step is executed again for the content completeness determination.

For instance, FIG. 6 is a schematic diagram of movement of a cache offset pointer according to Embodiment 4 of the disclosure. FIG. 6 shows a data boundary frame (represented by a boundary frame of A in FIG. 6) corresponding to A and some data packets (represented by part 1 and part 2 of A in FIG. 6) of A. The other frames are configured in a similar way to the above frame. Assuming that at moment 1 a livestream client completely receives data of frames C and D but does not receive complete data of frames A and B, and at moment 2 receives an expiration information data packet. In response to receiving the expiration information data packet, the livestream client may move the cache offset pointer to point to a position of a livestream data frame header of frame C, and return the data of frames C and D to an application layer, so as to avoid a problem of head blocking.

The optional example refines a process of caching data information related to a livestream data frame in a received data packet to a data cache list and a process of determining livestream data to be played matched with a livestreaming request from the data cache list. After the expiration duration is exceeded, expiration data may be automatically discarded, such that the problem of head blocking can be avoided, a playing effect of livestream data can be ensured, and user experience of the livestream client can be improved.

Examples of the apparatus for transmitting livestream data according to the example of the disclosure will be provided below. The apparatus belongs to a same inventive concept as the method for transmitting livestream data in Embodiment 1 or Embodiment 2. Reference may be made to Embodiment 1 or Embodiment 2 for contents not described in detail in the example of the apparatus for transmitting livestream data.

Embodiment 5

FIG. 7 is a schematic structural diagram of an apparatus for transmitting livestream data according to Embodiment 5 of the disclosure. The example may be applied to a case that livestream data is transmitted through a stream transmission channel of an unreliable type, so as to ensure a playing effect of the livestream data. As shown in FIG. 7, the apparatus is integrated into a livestream server, and comprises: a request reception module 510, a channel creation module 520, an information sending module 530, and a data frame sending module 540.

The request reception module 510 is configured to receive a livestreaming request sent by a livestream client, and determine a livestream data stream matched with the livestreaming request. The livestreaming request is snet through a first stream transmission channel, established by the livestream client, of a reliable type. The channel creation module 520 is configured to create a second stream transmission channel of an unreliable type, and establish an association between the second stream transmission channel and the first stream transmission channel. The information sending module 530 is configured to send response information for the livestreaming request and key information of a livestream data frame in the livestream data stream to the livestream client through the first stream transmission channel. The data frame sending module 540 is configured to send the livestream data frame in the livestream data stream to the livestream client through the second stream transmission channel.

According to the technical solution of the example of the disclosure, the livestream server receives the livestreaming request sent by the livestream client, and determines the livestream data stream matched with the livestreaming request. The livestreaming request is transmitted through the first stream transmission channel, established by the livestream client, of the reliable type. Then, the livestream server creates the second stream transmission channel of the unreliable type, and establishes the association between the second stream transmission channel and the first stream transmission channel. The livestream server transmits the response information for the livestreaming request and the key information of the livestream data frame in the livestream data stream to the livestream client through the first stream transmission channel. The livestream data frame in the livestream data stream is transmitted to the livestream client through the second stream transmission channel. In the technical solution, the livestream server creates the second stream transmission channel of the unreliable type, such that unreliable transmission of the livestream data frame can be implemented. As such, an effect of network transmission delay on livestreaming picture playing can be avoided, a playing effect of the livestream data can be ensured, and user experience of the livestream client can be improved.

Based on the technical solution, the apparatus further comprises:

an association frame transmission module configured to send an association frame representing the association between the second stream transmission channel and the first stream transmission channel to the livestream client through the first stream transmission channel, to cause the livestream client to determine that the first stream transmission channel is associated with the second stream transmission channel through the association frame.

Optionally, the association frame comprises: association mapping information of a stream transmission channel. The association mapping information comprises respective channel identifiers of the first stream transmission channel and the second stream transmission channel.

Based on the technical solution, the channel creation module 510 is configured to:

build a stream transmission channel required for transmission of a data stream of the unreliable type based on a preset transmission protocol, which is denoted as the second stream transmission channel;

obtain a first channel identifier of the first stream transmission channel and a second channel identifier of the second stream transmission channel; and form the association mapping information representing the association between the second stream transmission channel and the first stream transmission channel based on the first channel identifier and the second channel identifier.

Based on the technical solution, the information sending module 520 is configured to:

encapsulate the response information for the livestreaming request according to a message format of a reliable type of the preset transmission protocol so as to form a response message, and send the response message to the livestream client through the first stream transmission channel;

determine a file header of each livestream data frame in the livestream data stream and key data required for decoding; and encapsulate the file header and the key data according to the message format of the reliable type, form a key information data packet corresponding to the livestream data frame, and send the key information data packet to the livestream client through the first stream transmission channel.

Based on the technical solution, the data frame sending module 540 is configured to:

encapsulate audio-video data in each livestream data frame in the livestream data stream according to a message format of the unreliable type of the preset transmission protocol, and form at least one livestream data packet; and send the at least one livestream data packet to the livestream client through the second stream transmission channel.

Based on all the above technical solutions, the apparatus further comprises: a logic execution module. The logic execution module comprises:

an expiration duration determination unit configured to determine an expiration duration of each livestream data frame in the livestream data stream; and a discarding processing logic execution unit configured to execute, in response to that a retransmission operation for a related data packet of the livestream data frame is present, a discarding processing logic for the livestream data frame according to the expiration duration.

Optionally, the discarding processing logic execution unit is configured to:

retransmit, in response to determining that the related livestream data packet of the livestream data frame is lost during transmission, the related livestream data packet through the second stream transmission channel, and start retransmission timing when a retransmission of the related livestream data packet of the livestream data frame occurs for the first time; and form, in response to determining that an accumulated duration of retransmission timing exceeds the expiration duration, an expiration information data packet corresponding to the livestream data frame, and send the expiration information data packet to the livestream client, to cause the livestream client to discard related data of the livestream data frame from a data cache list.

The apparatus for transmitting livestream data according to the example of the disclosure may execute the method for transmitting livestream data according to Embodiment 1 or Embodiment 2 of the disclosure, and has corresponding functional modules corresponding to execution of the method for transmitting livestream data.

It should be noted that all units and modules comprised in the example of the apparatus for transmitting livestream data are merely divided according to a functional logic, but are not limited to the above division, as long as the corresponding functions may be achieved. In addition, specific names of all functional units are merely for convenience of mutual distinguishing, and are not used to limit the protection scope of the disclosure.

Examples of the apparatus for transmitting livestream data according to the example of the disclosure will be provided below. The apparatus belongs to a same inventive concept as the method for transmitting livestream data in Embodiment 3 or Embodiment 4. Reference may be made to Embodiment 3 or Embodiment 4 for contents not described in detail in the example of the apparatus for transmitting livestream data.

Embodiment 6

Figure 8:
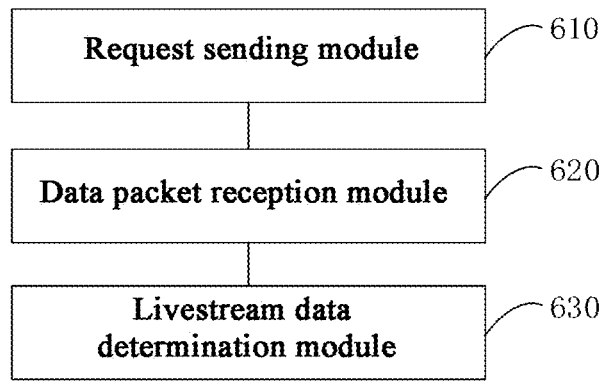
FIG. 8 is a schematic structural diagram of an apparatus for transmitting livestream data according to Embodiment 6 of the disclosure.

FIG. 8 is a schematic structural diagram of an apparatus for transmitting livestream data according to Embodiment 6 of the disclosure. The example may be applied to a case that livestream data is transmitted through a stream transmission channel of an unreliable type, so as to ensure a playing effect of the livestream data. As shown in FIG. 8, the apparatus is integrated into a livestream client, and comprises: a request sending module 610, a data packet reception module 620, and a livestream data determination module 630.

The request sending module 610 is configured to transmit a livestreaming request to a livestream server through a first stream transmission channel established of a reliable type. The data packet reception module 620 is configured to receive data packets sent by the livestream server through the first stream transmission channel and a second stream transmission channel according to the livestreaming request. The second stream transmission channel is a stream transmission channel, created by the livestream server, of an unreliable type. The livestream data determination module 630 is configured to determine livestream data to be played matched with the livestreaming request by analyzing the data packets received from the first stream transmission channel and the second stream transmission channel.

According to the technical solution of the example of the disclosure, the livestream client transmits the livestreaming request to the livestream server through the first stream transmission channel established of the reliable type, and the livestream server receives the livestreaming request sent by the livestream client, and determines a livestream data stream matched with the livestreaming request. Then, the livestream server creates the second stream transmission channel of the unreliable type, and establishes an association between the second stream transmission channel and the first stream transmission channel. The livestream server transmits response information for the livestreaming request and key information of a livestream data frame in the livestream data stream to the livestream client through the first stream transmission channel. Each livestream data frame in the livestream data stream is transmitted to the livestream client through the second stream transmission channel. The livestream client determines the livestream data to be played matched with the livestreaming request by analyzing the data packets received from the first stream transmission channel and the second stream transmission channel. In the technical solution, the livestream server creates the second stream transmission channel of the unreliable type, such that unreliable transmission of the livestream data frame can be implemented. As such, an effect of network transmission delay on livestreaming picture playing can be avoided, a playing effect of the livestream data can be ensured, and user experience of the livestream client can be improved.

Based on the technical solution, the data packets received through the first stream transmission channel are a response message corresponding to the livestreaming request, a key information data packet of a livestream data frame in a livestream data stream matched with the livestreaming request, and an association frame representing an association between the first stream transmission channel and the second stream transmission channel.

The data packet received through the second stream transmission channel is a livestream data packet of the livestream data frame in the livestream data stream matched with the livestreaming request. The livestream data packet comprises audio-video data of the livestream data frame.

Based on the technical solution, the livestream data determination module 630 comprises:

an analysis unit configured to receive the data packets from the first stream transmission channel and the second stream transmission channel, and analyze data contents of the received data packets;

a state determination unit configured to determine, in response to determining that a received data packet does not satisfy a state triggering condition through analysis, that stream transmission is in a blocked state, cache data information related to the livestream data frame in the received data packet to a data cache list, and continue to execute an analysis operation of a received data packet; and a livestream data determination unit configured to determine, in response to determining that a received data packet satisfies the state triggering condition through analysis, that stream transmission is currently in a working state, and determine the livestream data to be played matched with the livestreaming request from the data cache list.

The livestream data frame is a data frame in the livestream data stream matched with the livestreaming request.

Optionally, the state triggering condition is as follows: after a data packet received from the first stream transmission channel is a response message of the livestreaming request, a key information data packet of the livestream data frame associated with the livestreaming request is received from the first stream transmission channel; and an association frame representing an association between the second stream transmission channel and the first stream transmission channel is also received from the first stream transmission channel.

Based on the technical solution, the state determination unit is configured to cache the data information related to the livestream data frame in the received data packet to the data cache list as follows:

in response to determining that a received data packet is a livestream data packet received by the second stream transmission channel, the data information related to the livestream data frame in the received data packet is determined, and the data information is stored in the data cache list.

Based on the technical solution, the livestream data determination unit is configured to:

determine a livestream data frame header pointed to by a cache offset pointer in the data cache list;

determine, in response to determining that data content of a target livestream data frame corresponding to the livestream data frame header is complete, the livestream data frame as the livestream data to be played;

re-perform, in response to determining that data content of a target livestream data frame corresponding to the livestream data frame header is incomplete, a content completeness determination of the target livestream data frame at a set interval until an expiration information data packet sent by the livestream server for the target livestream data frame is received; and move the cache offset pointer to a livestream data frame header of a next frame of the target livestream data frame as a new target livestream data frame, and return to re-perform the content completeness determination.

The apparatus for transmitting livestream data according to the example of the disclosure may execute the method for transmitting livestream data according to Embodiment 3 or Embodiment 4 of the disclosure, and has corresponding functional modules corresponding to execution of the method for transmitting data.

It should be noted that all units and modules comprised in the example of the apparatus for transmitting livestream data are merely divided according to a functional logic, but are not limited to the above division, as long as the corresponding functions may be achieved. In addition, specific names of all functional units are merely for convenience of mutual distinguishing, and are not used to limit the protection scope of the disclosure.

Embodiment 7

Figure 9:
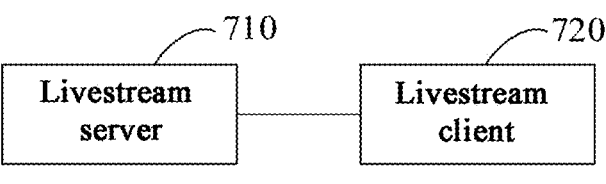
FIG. 9 is a schematic structural diagram of a system for transmitting livestream data according to Embodiment 7 of the disclosure.

FIG. 9 is a schematic structural diagram of a system for transmitting livestream data according to Embodiment 7 of the disclosure. The example may be applied to a case that livestream data is transmitted through a stream transmission channel of an unreliable type, so as to ensure a playing effect of the livestream data. As shown in FIG. 9, the system comprises: a livestream server 710 and a livestream client 720.

The livestream server 710 is configured to implement the method for transmitting livestream data according to Embodiment 1 or Embodiment 2. The livestream client 720 is configured to implement the method for transmitting livestream data according to Embodiment 3 or Embodiment 4.

According to the system for transmitting livestream data of the technical solution of the example of the disclosure, the livestream client transmits a livestreaming request to the livestream server through a first stream transmission channel established of a reliable type, and the livestream server receives the livestreaming request sent by the livestream client, and determines a livestream data stream matched with the livestreaming request. Then, the livestream server creates a second stream transmission channel of an unreliable type, and establishes an association between the second stream transmission channel and the first stream transmission channel. The livestream server transmits response information for the livestreaming request and key information of a livestream data frame in a livestream data stream to the livestream client through the first stream transmission channel. The livestream data frame in the livestream data stream is transmitted to the livestream client through the second stream transmission channel. The livestream client determines livestream data to be played matched with the livestreaming request by analyzing data packets received from the first stream transmission channel and the second stream transmission channel. In the technical solution, the livestream server creates the second stream transmission channel of the unreliable type, such that unreliable transmission of the livestream data frame can be implemented. As such, an effect of network transmission delay on livestreaming picture playing can be avoided, a playing effect of the livestream data can be ensured, and user experience of the livestream client can be improved.

Embodiment 8

Figure 10:
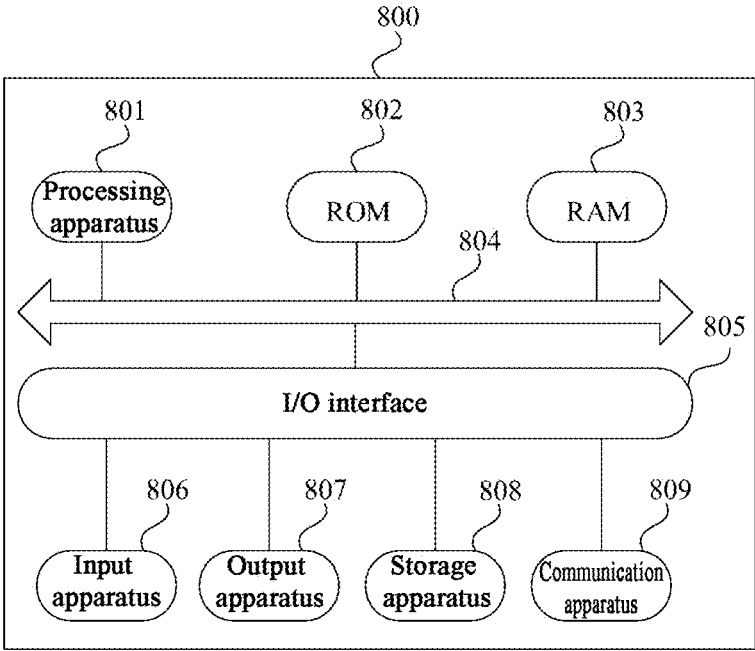
FIG. 10 is a schematic structural diagram of an electronic device according to Embodiment 8 of the disclosure.

FIG. 10 shows a schematic structural diagram suitable for implementing an electronic device 800 according to an example of the disclosure below. The electronic device shown in FIG. 10 is only illustrative, and is not intended to limit functions and a use scope of the examples of the disclosure.

As shown in FIG. 10, the electronic device 800 may comprise a processing apparatus (for instance, a central processing unit or a graphics processing unit) 801, which may execute various appropriate actions and processing according to a program stored in a read only memory (ROM) 802 or a program loaded from a storage apparatus 808 to a random access memory (RAM) 803. The RAM 803 further stores various programs and data required for operations of the electronic device 800. The processing apparatus 801, the ROM 802 and the RAM 803 are connected to one another by means of a bus 804. An input/output (I/O) interface 805 is further connected to the bus 804.

Generally, the following apparatuses may be connected to the I/O interface 805: an input apparatus 806 including, for instance, a touch screen, a touch pad, a keyboard, a mouse, a camera, a microphone, an accelerometer, a gyroscope, etc.; an output apparatus 807 including, for instance, a liquid crystal display (LCD), a speaker, a vibrator, etc.; the storage apparatus 808 including, for instance, a magnetic tape, a hard disk, etc.; and a communication apparatus 809. The communication apparatus 809 may allow the electronic device 800 to be in wireless or wired communication with other devices so as to achieve data exchange. Although FIG. 10 shows the electronic device 800 including various apparatuses, it should be understood that not all the apparatuses shown are required to be implemented or comprised. More or fewer apparatuses may be alternatively implemented or comprised.

Particularly, according to the example of the disclosure, the process described above with reference to the flow diagram may be implemented to be a computer software program. For instance, an example of the disclosure comprises a computer program product, which comprises a computer program hosted by a non-transitory computer-readable medium. The computer program comprises a program code configured to execute the method shown in the flow diagram. In such an example, the computer program may be downloaded and installed from a network through the communication apparatus 809, or installed from the storage apparatus 808, or installed from the ROM 802. The computer program executes the functions defined in the method according to the example of the disclosure when being executed by the processing apparatus 801.

The electronic device according to the example of the disclosure belongs to the same inventive concept as the method for transmitting livestream data according to the above examples. Reference may be made to the above examples for technical details not described in detail in the example of the disclosure.

Example 9

An example of the disclosure provides a computer storage medium, which stores a computer program. The computer program implements the method for transmitting livestream data according to the example when being executed by a processor.

It should be noted that the computer-readable medium described in the disclosure may be a computer-readable signal medium, or a computer-readable storage medium, or any combination thereof. For instance, the computer-readable storage medium may be, but is not limited to, an electronic, magnetic, optical, electromagnetic, infrared, or semiconductor system, apparatus, or device, or any suitable combination thereof. More specific instances of the computer-readable storage medium may comprise, but are not limited to, an electrical connection having on one or more wires, a portable computer disk, a hard disk, a random access memory (RAM), a read only memory (ROM), an erasable programmable read only memory (EPROM or a flash memory), an optical fiber, a portable compact disc read only memory (CD-ROM), an optical storage device, a magnetic storage device, or any suitable combination thereof. In the disclosure, the computer-readable storage medium may be any tangible medium including or storing a program. The program may be used by or in combination with an instruction execution system, apparatus or device. In the disclosure, the computer-readable signal medium may comprise a data signal in a baseband or as part of a carrier for transmission, and the data signal carries a computer-readable program code. The transmitted data signal may be in various forms, and may be, but is not limited to, an electromagnetic signal, an optical signal, or any suitable combination thereof. The computer-readable signal medium may further be any computer-readable medium other than the computer-readable storage medium. The computer-readable signal medium may transmit, propagate or transmit a program used by or in combination with an instruction execution system, apparatus or device. The program code comprised in the computer-readable medium may be sent by any suitable medium, including but not limited to an electric wire, an optical cable, radio frequency (RF), etc., or any suitable combination thereof.

In some embodiments, a receiving end and a sending end may be in communication with each other with any currently known or future-developed network protocol, for instance, a hypertext transfer protocol (HTTP), and may be interconnected with digital data communication (for instance, a communication network) in any form or medium. Instances of the communication network comprise a local area network (LAN), a wide area network (WAN), the internet work (for instance, the Internet), an end-to-end network (for instance, an ad hoc end-to-end network), and any currently-known or future-developed networks.

The computer-readable medium may be comprised in the above livestream server, or may exist independently without being assembled into the livestream server.

The computer-readable medium carries at least one program. When the at least one program is executed by the livestream server, the livestream server is caused to: receive a livestreaming request sent by a livestream client, and determine a livestream data stream matched with the livestreaming request, where the livestreaming request is transmitted through a first stream transmission channel, established by the livestream client, of a reliable type; create a second stream transmission channel of an unreliable type, and establish an association between the second stream transmission channel and the first stream transmission channel; transmit response information for the livestreaming request and key information of a livestream data frame in the livestream data stream to the livestream client through the first stream transmission channel; and transmit the livestream data frame in the livestream data stream to the livestream client through the second stream transmission channel.

The computer-readable medium may be comprised in the livestream client, or may exist independently without being assembled into the livestream client.

The computer-readable medium carries at least one program. When the at least one program is executed by the livestream client, the livestream client is caused to: transmit a livestreaming request to a livestream server through a first stream transmission channel established of a reliable type; receive data packets sent by the livestream server through the first stream transmission channel and a second stream transmission channel according to the livestreaming request, where the second stream transmission channel is a stream transmission channel, created by the livestream server, of an unreliable type; and determine livestream data to be played matched with the livestreaming request by analyzing the data packets received from the first stream transmission channel and the second stream transmission channel.

A computer program code configured to execute an operation of the disclosure may be written in one or more programming languages or a combination thereof. The programming languages comprise, but are not limited to, object-oriented programming languages such as Java, Smalltalk, and C++, and further comprise conventional procedural programming languages such as "C" or similar programming languages. The program code may be executed entirely on a user computer, executed partially on a user computer, executed as a stand-alone software package, executed partially on a user computer and partially on a remote computer, or executed entirely on the remote computer or a sending end. In the case involving the remote computer, the remote computer may be connected to the user computer through any type of networks including the local area network (LAN) or the wide area network (WAN), or may be connected to an external computer (for instance, the remote computer is connected through the Internet by an Internet service provider).

The flow diagrams and block diagrams in the accompanying drawings illustrate system structures, functions and operations, which may be implemented according to systems, methods and computer program products in all the examples of the disclosure. In view of that, each block in the flow diagrams or block diagrams may represent a module, a program segment, or part of a code, which comprises one or more executable instructions configured to implement speci-fied logic functions. It should further be noted that in some alternative implementations, the functions noted in the blocks may also occur in an order different from that in the accompanying drawings. For instance, the functions represented by two continuous blocks may be actually implemented basically in parallel, or may be implemented in reverse orders, which depends on the involved functions. It should further be noted that each block in the block diagrams and/or flow diagrams and combinations of the blocks in the block diagrams and/or the flow diagrams may be implemented with dedicated hardware-based systems that implement the specified functions or operations, or may be implemented with combinations of dedicated hardware and computer instructions.

The units involved in the examples described in the disclosure may be implemented by software or hardware. Names of the units do not limit the units themselves in some cases. For instance, an editable content display unit may also be described as an "editing unit".

The functions described herein may be at least partially executed by one or more hardware logic components. For instance, for the nonrestrictive purposes, illustrative types of hardware logic components that may be used comprise: a field programmable gate array (FPGA), an application specific integrated circuit (ASIC), application specific standard parts (ASSPs), a system on chip (SOC), a complex programmable logic device (CPLD), etc.

In the context of the disclosure, the machine-readable medium may be a tangible medium, which may comprise or store a program used by or used in combination with an instruction execution system, apparatus or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combination thereof. More specific instances of the machine-readable storage medium may comprise an electrical connection based on one or more wires, a portable computer disk, a hard disk, a random access memory (RAM), a read only memory (ROM), an erasable programmable read only memory (EPROM or a flash memory), an optical fiber, a portable compact disk read only memory (CD-ROM), an optical storage device, a magnetic storage device, or any suitable combination thereof.

According to at least one example of the disclosure, [Embodiment 1] provides a method for transmitting livestream data. The method is applied to a livestream server and comprises the following steps:

a livestreaming request sent by a livestream client is received, and a livestream data stream matched with the livestreaming request is determined, where the livestreaming request is transmitted through a first stream transmission channel, established by the livestream client, of a reliable type;

a second stream transmission channel of an unreliable type is created, and an association between the second stream transmission channel and the first stream transmission channel is established;

response information for the livestreaming request and key information of a livestream data frame in the livestream data stream is sent to the livestream client through the first stream transmission channel; and the livestream data frame in the livestream data stream is sent to the livestream client through the second stream transmission channel.

According to at least one example of the disclosure, [Embodiment 2] provides a method for transmitting livestream data. The method is applied to a livestream server.

Optionally, after the second stream transmission channel, associated with the first stream transmission channel, of the unreliable type is created, the method further comprises the following step:

an association frame representing the association between the second stream transmission channel and the first stream transmission channel is sent to the livestream client through the first stream transmission channel, to cause the livestream client to determine that the first stream transmission channel is associated with the second stream transmission channel through the association frame.

According to at least one example of the disclosure, [Embodiment 3] provides a method for transmitting livestream data. The method is applied to a livestream server.

Optionally, the association frame comprises: association mapping information of a stream transmission channel, and the association mapping information comprises respective channel identifiers of the first stream transmission channel and the second stream transmission channel.

According to at least one example of the disclosure, [Embodiment 4] provides a method for transmitting livestream data. The method is applied to a livestream server.

Optionally, the steps that the second stream transmission channel of the unreliable type is created, and the association between the second stream transmission channel and the first stream transmission channel is established comprise the following steps:

a stream transmission channel for transmission of a data stream of the unreliable type is built based on a preset transmission protocol as the second stream transmission channel;

a first channel identifier of the first stream transmission channel and a second channel identifier of the second stream transmission channel are obtained; and association mapping information representing the association between the second stream transmission channel and the first stream transmission channel is formed based on the first channel identifier and the second channel identifier.

According to at least one example of the disclosure, [Embodiment 5] provides a method for transmitting livestream data. The method is applied to a livestream server.

Optionally, the step that the response information for the livestreaming request and the key information of the livestream data frame in the livestream data stream is sent to the livestream client through the first stream transmission channel comprises the following steps:

the response information for the livestreaming request is encapsulated according to a message format of a reliable type of a preset transmission protocol so as to form a response message, and the response message is transmitted to the livestream client through the first stream transmission channel;

a file header of each livestream data frame in the livestream data stream and key data required for decoding are determined; and the file header and the key data are encapsulated according to the message format of the reliable type, a key information data packet corresponding to the livestream data frame is formed, and the key information data packet is sent to the livestream client through the first stream transmission channel.

According to at least one example of the disclosure, [Embodiment 6] provides a method for transmitting livestream data. The method is applied to a livestream server.

Optionally, the step that the livestream data frame in the livestream data stream is transmitted to the livestream client through the second stream transmission channel comprises the following steps:

for each livestream data frame in the livestream data stream, audio-video data in the livestream data frame is encapsulated according to a message format of an unreliable type of a preset transmission protocol to form at least one livestream data packet; and the at least one livestream data packet is sent to the livestream client through the second stream transmission channel.

According to at least one example of the disclosure, [Embodiment 7] provides a method for transmitting livestream data. The method is applied to a livestream server.

Optionally, in a process of sending the livestream data frame in the livestream data stream to the livestream client through the second stream transmission channel, the method further comprises the following steps:

for each livestream data frame in the livestream data stream, an expiration duration of the livestream data frame is determined, and in response to that a retransmission operation for a related data packet of the livestream data frame is present, a discarding processing logic for the livestream data frame is executed according to the expiration duration.

According to at least one example of the disclosure, [Embodiment 8] provides a method for transmitting livestream data. The method is applied to a livestream server.

Optionally, the step that in response to that the retransmission operation for the related data packet of the livestream data frame is present, the discarding processing logic for the livestream data frame is executed according to the expiration duration comprises the following steps:

in response to determining that a related livestream data packet of the livestream data frame is lost during transmission, the related livestream data packet is resent through the second stream transmission channel, and a retransmission timing is started when a retransmission of the related livestream data packet of the livestream data frame occurs for the first time; and in response to determining that an accumulated duration of the retransmission timing exceeds the expiration duration, an expiration information data packet corresponding to the livestream data frame is formed, and the expiration information data packet is sent to the livestream client, to cause the livestream client to discard related data of the livestream data frame from a data cache list.

According to at least one example of the disclosure, [Example 9] provides a method for transmitting livestream data. The method is applied to a livestream client and comprises the following steps:

a livestreaming request is sent to a livestream server through an established first stream transmission channel of a reliable type;

data packets sent by the livestream server through the first stream transmission channel and a second stream transmission channel for the livestreaming request are received, where the second stream transmission channel is a stream transmission channel, created by the livestream server, of an unreliable type; and livestream data to be played matched with the livestreaming request is determined by analyzing the data packets received from the first stream transmission channel and the second stream transmission channel.

According to at least one example of the disclosure, [Embodiment 10] provides a method for transmitting livestream data. The method is applied to a livestream client.

Optionally, the data packets received through the first stream transmission channel are a response message corresponding to the livestreaming request, a key information data packet of a livestream data frame in a livestream data stream matched with the livestreaming request, and an association frame representing an association between the first stream transmission channel and the second stream transmission channel.

The data packet received through the second stream transmission channel is a livestream data packet of the livestream data frame in the livestream data stream matched with the livestreaming request. The livestream data packet comprises audio-video data of the livestream data frame.

According to at least one example of the disclosure, [Embodiment 11] provides a method for transmitting livestream data. The method is applied to a livestream client.

Optionally, the step that the livestream data to be played matched with the livestreaming request is determined by analyzing the data packets received from the first stream transmission channel and the second stream transmission channel comprises the following steps:

the data packets are received from the first stream transmission channel and the second stream transmission channel, and data content of the data packets received are analyzed;

in response to determining that a received data packet does not satisfy a state triggering condition through analysis, it is determined that stream transmission is in a blocked state, data information related to a livestream data frame in the received data packet is cached to a data cache list, and an analysis operation of a received data packet is continued to be executed; and in response to determining that a received data packet satisfies the state triggering condition through analysis, it is determined that stream transmission is currently in a working state, and the livestream data to be played matched with the livestreaming request is determined from the data cache list.

The livestream data frame is a data frame in the livestream data stream matched with the livestreaming request.

According to at least one example of the disclosure, [Embodiment 12] provides a method for transmitting livestream data. The method is applied to a livestream client.

Optionally, the state triggering condition is as follows:

after a data packet received from the first stream transmission channel is a response message of the livestreaming request, a key information data packet of the livestream data frame associated with the livestreaming request is received from the first stream transmission channel; and an association frame representing an association between the second stream transmission channel and the first stream transmission channel is also received from the first stream transmission channel.

According to at least one example of the disclosure, [Embodiment 13] provides a method for transmitting livestream data. The method is applied to a livestream client.

The step that the data information related to the livestream data frame in the received data packet is cached to the data cache list comprises the following steps:

in response to determining that a received data packet is a livestream data packet received through the second stream transmission channel, data information related to the livestream data frame in the received data packet is determined, and the data information is stored in the data cache list.

According to at least one example of the disclosure, [Embodiment 14] provides a method for transmitting livestream data. The method is applied to a livestream client.

Optionally, the step that the livestream data to be played matched with the livestreaming request is determined from the data cache list comprises the following steps:

a livestream data frame header pointed to by a cache offset pointer in the data cache list is determined;

in response to determining that data content of a target livestream data frame corresponding to the livestream data frame header is complete, the livestream data frame is determined as the livestream data to be played;

in response to determining that data content of a target livestream data frame corresponding to the livestream data frame header is incomplete, a content completeness determination of the target livestream data frame is re-performed at a set interval until an expiration information data packet sent by the livestream server for the target livestream data frame is received; and the cache offset pointer is moved to a livestream data frame header of a next frame of the target livestream data frame as a new target livestream data frame, and the above step is executed again for the content completeness determination.

According to at least one example of the disclosure, [Embodiment 15] provides an apparatus for transmitting livestream data. The apparatus is integrated into a livestream server. The apparatus comprises:

a request reception module configured to receive a livestreaming request sent by a livestream client, and determine a livestream data stream matched with the livestreaming request, where the livestreaming request is transmitted through a first stream transmission channel, established by the livestream client, of a reliable type;

a channel creation module configured to create a second stream transmission channel of an unreliable type, and establish an association between the second stream transmission channel and the first stream transmission channel;

an information sending module configured to send response information for the livestreaming request and key information of a livestream data frame in the livestream data stream to the livestream client through the first stream transmission channel; and a data frame sending module configured to send the livestream data frame in the livestream data stream to the livestream client through the second stream transmission channel.

According to at least one example of the disclosure, [Embodiment 16] provides an apparatus for transmitting livestream data. The apparatus is integrated into a livestream client. The apparatus comprises:

a request sending module configured to send a livestreaming request to a livestream server through a first stream transmission channel established of a reliable type;

a data packet reception module configured to receive data packets sent by the livestream server through the first stream transmission channel and a second stream transmission channel according to the livestreaming request, where the second stream transmission channel is a stream transmission channel, created by the livestream server, of an unreliable type; and a livestream data determination module configured to determine livestream data to be played matched with the livestreaming request by analyzing the data packets received from the first stream transmission channel and the second stream transmission channel.

Further, although operations are depicted in a particular order, it should be understood that the operations are not required to be executed in the particular order shown or in a sequential order. In some cases, multitasking and parallel processing may be advantageous. Likewise, although several specific implementation details are comprised in the above discussion, the details should not be construed as limiting the scope of the disclosure. Some features described in the context of separate examples may also be implemented in combination in a single example. On the contrary, various features described in the context of a single example may also be implemented in a plurality of examples independently or in any suitable sub-combination manner.

We claim:

1. A method for transmitting livestream data, applied to a livestream server and comprising:

receiving a livestreaming request sent by a livestream client, and determining a livestream data stream matched with the livestreaming request, wherein the livestreaming request is transmitted through a first stream transmission channel of a reliable type established by the livestream client;

creating a second stream transmission channel of an unreliable type, and establishing an association between the second stream transmission channel and the first stream transmission channel;

sending, through the first stream transmission channel and to the livestream client, response information for the livestreaming request and key information of a livestream data frame in the livestream data stream; and sending, through the second stream transmission channel, the livestream data frame in the livestream data stream to the livestream client, wherein in a process of sending through the second stream transmission channel the livestream data frame in the livestream data stream to the livestream client, the method further comprises:

determining, for each livestream data frame in the livestream data stream, an expiration duration of the livestream data frame, and executing, in response to that a retransmission operation for a related data packet of the livestream data frame is present, a discarding processing logic for the livestream data frame according to the expiration duration.

2. The method according to claim 1, further comprising, after creating the second stream transmission channel of the unreliable type, and establishing the association between the second stream transmission channel and the first stream transmission channel:

sending, through the first stream transmission channel, an association frame representing the association between the second stream transmission channel and the first stream transmission channel to the livestream client, to cause the livestream client to determine based on the association frame that the first stream transmission channel is associated with the second stream transmission channel.

3. The method according to claim 2, wherein the association frame comprises: association mapping information of a stream transmission channel, and the association mapping information comprises respective channel identifiers of the first stream transmission channel and the second stream transmission channel.

4. The method according to claim 1, wherein creating the second stream transmission channel of the unreliable type, and establishing the association between the second stream transmission channel and the first stream transmission channel comprises:

building, based on a preset transmission protocol, a stream transmission channel required for transmission of a data stream of the unreliable type as the second stream transmission channel;

obtaining a first channel identifier of the first stream transmission channel and a second channel identifier of the second stream transmission channel; and forming, based on the first channel identifier and the second channel identifier, association mapping information representing the association between the second stream transmission channel and the first stream transmission channel.

5. The method according to claim 1, wherein sending, through the first stream transmission channel and to the livestream client, the response information for the livestreaming request and the key information of the livestream data frame in the livestream data stream comprises:

encapsulating the response information for the livestreaming request according to a message format of a reliable type of a preset transmission protocol to form a response message, and sending the response message to the livestream client through the first stream transmission channel;

determining, for each livestream data frame in the livestream data stream, a file header of the livestream data frame and key data required for decoding; and encapsulating the file header and the key data according to the message format of the reliable type to form a key information data packet corresponding to the livestream data frame, and sending the key information data packet to the livestream client through the first stream transmission channel.

6. The method according to claim 1, wherein sending through the second stream transmission channel the livestream data frame in the livestream data stream to the livestream client comprises:

encapsulating, for each livestream data frame in the livestream data stream, audio-video data in the livestream data frame according to a message format of an unreliable type of a preset transmission protocol to form at least one livestream data packet; and sending the at least one livestream data packet to the livestream client through the second stream transmission channel.

7. The method according to claim 1, wherein executing, in response to the retransmission operation for the related data packet of the livestream data frame, the discarding processing logic for the livestream data frame according to the expiration duration comprises:

resending, in response to determining that the related livestream data packet of the livestream data frame is lost during transmission, the related livestream data packet through the second stream transmission channel, and starting retransmission timing when a retransmission of the related livestream data packet of the livestream data frame occurs for the first time; and forming, in response to determining that an accumulated duration of the retransmission timing exceeds the expiration duration, an expiration information data packet corresponding to the livestream data frame, and sending the expiration information data packet to the livestream client, to cause the livestream client to discard related data of the livestream data frame from a data cache list.

8. A method for transmitting livestream data, applied to a livestream client and comprising:

sending a livestreaming request to a livestream server through an established first stream transmission channel of a reliable type;

receiving data packets sent by the livestream server through the first stream transmission channel and a second stream transmission channel for the livestreaming request, wherein the second stream transmission channel is a stream transmission channel of an unreliable type created by the livestream server; and determining livestream data to be played matched with the livestreaming request by analyzing the data packets received from the first stream transmission channel and the second stream transmission channel, wherein determining the livestream data to be played matched with the livestreaming request by analyzing the data packets received from the first stream transmission channel and the second stream transmission channel comprises:

receiving data packets from the first stream transmission channel and the second stream transmission channel, and analyzing data content of the received data packets;

determining, in response to determining that a received data packet does not satisfy a state triggering condition through analysis, that stream transmission is in a blocked state, caching data information related to a livestream data frame in the received data packet to a data cache list, and continuing to execute an analysis operation of a received data packet; and determining, in response to determining that a received data packet satisfies the state triggering condition through analysis, that stream transmission is currently in a working state, and determining the livestream data to be played matched with the livestreaming request from the data cache list, and wherein the livestream data frame is a data frame in the livestream data stream matched with the livestreaming request.

9. The method according to claim 8, wherein the data packets received through the first stream transmission channel are a response message corresponding to the livestreaming request, a key information data packet corresponding to the livestream data frame in the livestream data stream matched with the livestreaming request, and an association frame representing an association between the first stream transmission channel and the second stream transmission channel; and wherein a data packet received through the second stream transmission channel is a livestream data packet corresponding to the livestream data frame in the livestream data stream matched with the livestreaming request, and the livestream data packet comprises audio-video data of the livestream data frame.

10. The method according to claim 8, wherein the state triggering condition is as follows:

after a data packet received from the first stream transmission channel is a response message of the livestreaming request, a key information data packet of the livestream data frame associated with the livestreaming request is received from the first stream transmission channel; and an association frame representing an association between the second stream transmission channel and the first stream transmission channel is also received from the first stream transmission channel.

11. The method according to claim 10, wherein caching the data information related to the livestream data frame in the received data packet to the data cache list comprises:

determining, in response to determining that a received data packet is a livestream data packet received through the second stream transmission channel, data information related to the livestream data frame in the received data packet, and storing the data information in the data cache list.

12. The method according to claim 8, wherein determining the livestream data to be played matched with the livestreaming request from the data cache list comprises:

determining a livestream data frame header pointed to by a cache offset pointer in the data cache list;

determining, in response to determining that data content of a target livestream data frame corresponding to the livestream data frame header is complete, the livestream data frame as the livestream data to be played;

re-performing, in response to determining that data content of the target livestream data frame corresponding to the livestream data frame header is incomplete, a content completeness determination of the target livestream data frame at a set interval until receiving an expiration information data packet sent by the livestream server for the target livestream data frame; and moving the cache offset pointer to a livestream data frame header of a next frame of the target livestream data frame as a new target livestream data frame, and returning to re-perform the content completeness determination.

13. An electronic device, comprising:

at least one processor; and a memory configured to store at least one program, wherein the at least one program, when executed by the at least one processor, causes the at least one processor to:

receive a livestreaming request sent by a livestream client, and determine a livestream data stream matched with the livestreaming request, wherein the livestreaming request is transmitted through a first stream transmission channel of a reliable type established by the livestream client;

create a second stream transmission channel of an unreliable type, and establish an association between the second stream transmission channel and the first stream transmission channel;

send, through the first stream transmission channel and to the livestream client, response information for the livestreaming request and key information of a livestream data frame in the livestream data stream; and send, through the second stream transmission channel, the livestream data frame in the livestream data stream to the livestream client, and wherein in a process of sending through the second stream transmission channel the livestream data frame in the livestream data stream to the livestream client, the at least one processor is caused to:

determine, for each livestream data frame in the livestream data stream, an expiration duration of the livestream data frame, and execute, in response to that a retransmission operation for a related data packet of the livestream data frame is present, a discarding processing logic for the livestream data frame according to the expiration duration.

14. The electronic device according to claim 13, wherein the at least one processor is further caused to, after creating the second stream transmission channel of the unreliable type, and establishing the association between the second stream transmission channel and the first stream transmission channel:

send, through the first stream transmission channel, an association frame representing the association between the second stream transmission channel and the first stream transmission channel to the livestream client, to cause the livestream client to determine based on the association frame that the first stream transmission channel is associated with the second stream transmission channel.

15. The electronic device according to claim 14, wherein the association frame comprises: association mapping information of a stream transmission channel, and the association mapping information comprises respective channel identifiers of the first stream transmission channel and the second stream transmission channel.

16. The electronic device according to claim 13, wherein the at least one processor being caused to create the second stream transmission channel of the unreliable type, and establish the association between the second stream transmission channel and the first stream transmission channel comprises being caused to:

build, based on a preset transmission protocol, a stream transmission channel required for transmission of a data stream of the unreliable type as the second stream transmission channel;

obtain a first channel identifier of the first stream transmission channel and a second channel identifier of the second stream transmission channel; and form, based on the first channel identifier and the second channel identifier, association mapping information representing the association between the second stream transmission channel and the first stream transmission channel.

17. The electronic device according to claim 13, wherein the at least one processor being caused to send, through the first stream transmission channel and to the livestream client, the response information for the livestreaming request and the key information of the livestream data frame in the livestream data stream comprises being caused to:

encapsulate the response information for the livestreaming request according to a message format of a reliable type of a preset transmission protocol to form a response message, and send the response message to the livestream client through the first stream transmission channel;

determine, for each livestream data frame in the livestream data stream, a file header of the livestream data frame and key data required for decoding; and encapsulate the file header and the key data according to the message format of the reliable type to form a key information data packet corresponding to the livestream data frame, and send the key information data packet to the livestream client through the first stream transmission channel.

18. The electronic device according to claim 13, wherein the at least one processor being caused to send through the second stream transmission channel the livestream data frame in the livestream data stream to the livestream client comprises being caused to:

encapsulate, for each livestream data frame in the livestream data stream, audio-video data in the livestream data frame according to a message format of an unreliable type of a preset transmission protocol to form at least one livestream data packet; and send the at least one livestream data packet to the livestream client through the second stream transmission channel.

* * * * *